(12) United States Patent
Sakai et al.

(10) Patent No.: US 9,361,674 B2
(45) Date of Patent: Jun. 7, 2016

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Hiroyuki Sakai, Chigasaki (JP); Kouta Murasawa, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/525,020

(22) Filed: Oct. 27, 2014

(65) Prior Publication Data

US 2015/0117719 A1 Apr. 30, 2015

(30) Foreign Application Priority Data

Oct. 29, 2013 (JP) .................... 2013-224604

(51) Int. Cl.
*G06K 9/40* (2006.01)
*G06T 5/00* (2006.01)
*G06T 5/20* (2006.01)

(52) U.S. Cl.
CPC ............. *G06T 5/006* (2013.01); *G06T 5/003* (2013.01); *G06T 5/20* (2013.01); *G06T 5/001* (2013.01)

(58) Field of Classification Search
None
See application file for complete search history.

(56) References Cited

U.S. PATENT DOCUMENTS

| | | | |
|---|---|---|---|
| 6,323,934 B1* | 11/2001 | Enomoto | G06T 5/006 355/32 |
| 2003/0189579 A1* | 10/2003 | Pope | G06T 5/004 345/660 |
| 2007/0223815 A1* | 9/2007 | Makram-Ebeid | G06K 9/34 382/173 |
| 2010/0177979 A1* | 7/2010 | Kotani | G06T 5/20 382/255 |
| 2012/0194709 A1* | 8/2012 | Yokohata | H04N 5/23212 348/240.3 |

FOREIGN PATENT DOCUMENTS

| | | |
|---|---|---|
| JP | 2010-097534 A | 4/2010 |
| JP | 2010-217808 A | 9/2010 |

* cited by examiner

*Primary Examiner* — Shervin Nakhjavan
(74) *Attorney, Agent, or Firm* — Canon USA, Inc., IP Division

(57) ABSTRACT

An apparatus includes an acquisition unit configured to acquire an input image, an identifying unit configured to identify a distance from a reference point to a processing target pixel in the input image, a deformation unit configured to deform an image based on the distance, and a sharpening processing unit configured to perform sharpening processing on an image while changing a strength of the sharpening processing, the changing of the strength based on the distance.

28 Claims, 18 Drawing Sheets

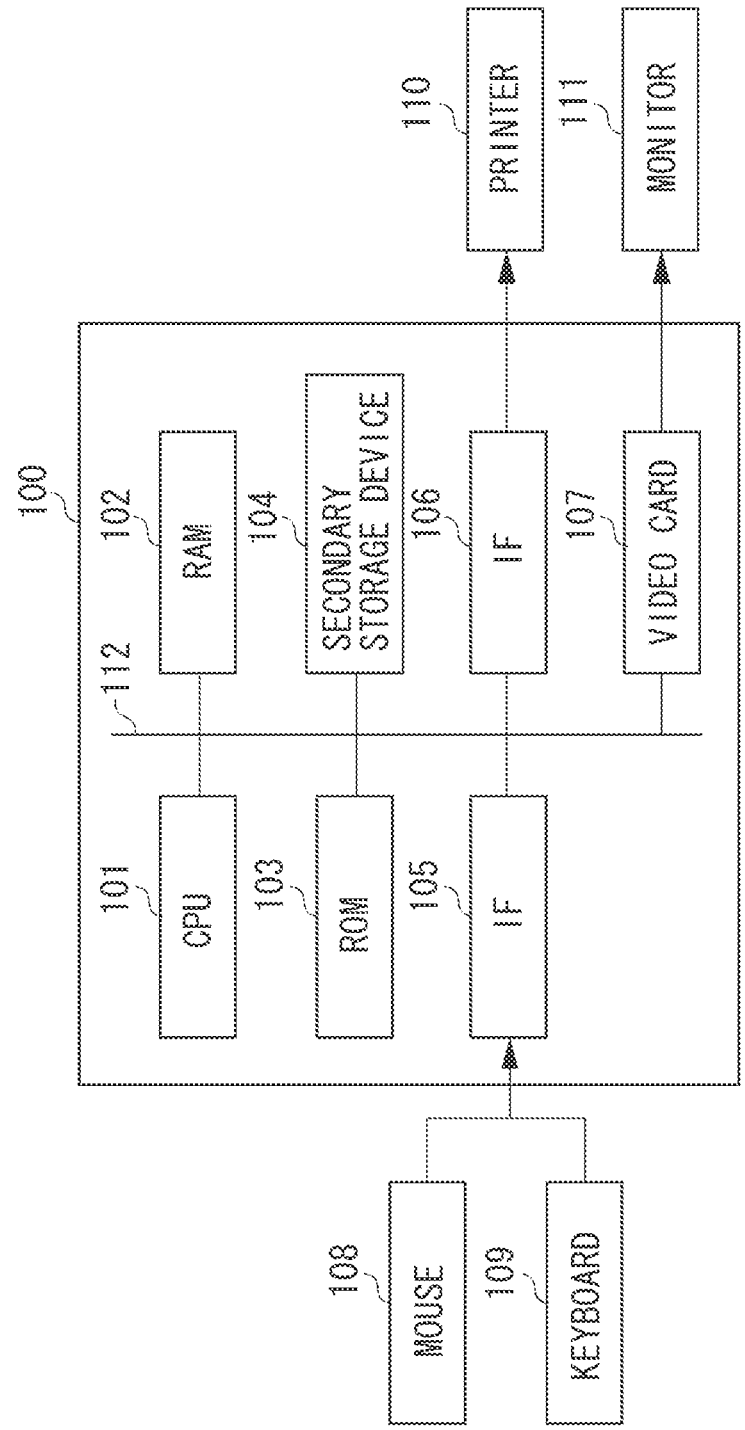

IMAGE PROCESSING APPARATUS, IMAGE PROCESSING METHOD, AND STORAGE MEDIUM

BACKGROUND OF THE INVENTION

1. Field of the Invention

The present invention relates to an image processing apparatus, an image processing method, and a storage medium that perform processing for deforming an input image.

2. Description of the Related Art

Conventionally, a fisheye lens has been known as a lens used in a camera or the like. The fisheye lens comes in various types, and any of them function to cause an image viewed via the fisheye lens to appear enlarged in the vicinity of a reference point such as a center of the image, compared to an image viewed without using the fisheye lens. Further, there has been known a technique for acquiring an image similar to the image viewed via such a fisheye lens by processing image data (hereinafter referred to as fisheye processing). More specifically, there has been known a method of setting the reference point in the image data, and performing predetermined deformation processing while using the reference point as a center in the deformation, when performing deformation processing such as the fisheye processing (refer to Japanese Patent Application Laid-Open Nos. 2010-97534 and 2010-217808).

On the other hand, according to the method discussed in Japanese Patent Application Laid-Open Nos. 2010-97534 and 2010-217808, the reference point is set in image data captured with use of a normal lens. Then, this method aims to reproduce a result of shooting with use of the fisheye lens by performing deformation processing for enlarging the image data around the reference point and reducing the periphery of the image data. According to this method, a region to be enlarged is enlarged by interpolation of pixels from surrounding pixels, and this region ends up in incurring a blurred impression because adjacent pixels tend to be similar to each other. Conversely, in a region to be reduced, pixels are thinned out to decrease the number of pixels, and this region ends up in incurring such an impression that sharpness is excessively enhanced because simply thinning out pixels causes pixels that had been away from each other to be brought close to each other to thereby make a change in the pixels unsmooth.

In this manner, the conventional technique results in generation of an image locally blurred yet having a portion with sharpness enhanced conversely. Therefore, the conventional technique has a problem of being unable to actually reproduce the image viewed via the fisheye lens from the image data in an appropriate manner.

SUMMARY OF THE INVENTION

According to an aspect of the present invention, an apparatus includes an acquisition unit configured to acquire an input image, an identifying unit configured to identify a distance from a reference point to a processing target pixel in the input image, a deformation unit configured to deform an image based on the distance, and a sharpening processing unit configured to perform sharpening processing on an image while changing a strength of the sharpening processing, the changing of the strength based on the distance.

Further features of the present invention will become apparent from the following description of exemplary embodiments with reference to the attached drawings.

BRIEF DESCRIPTION OF THE DRAWINGS

FIGS. 1A and 1B are block diagrams respectively illustrating a hardware configuration and functional blocks of an image processing apparatus according to a first exemplary embodiment.

DESCRIPTION OF THE EMBODIMENTS

Figure 1B:
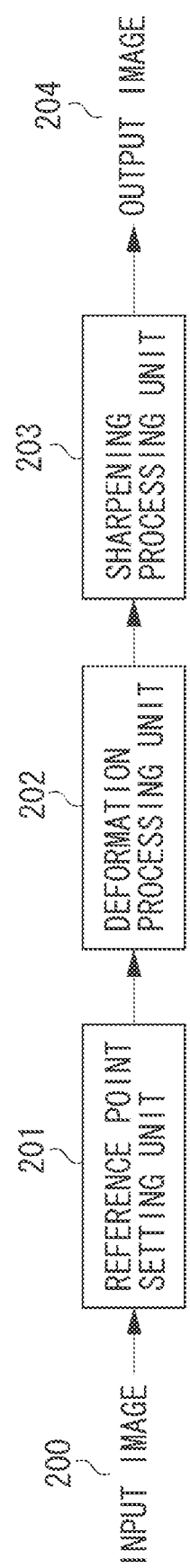

Various exemplary embodiments, features, and aspects of the invention will be described in detail below with reference to the drawings. In the following description, the exemplary embodiments will be described based on an example in which the present invention is carried out by means of an image processing application executed on a personal computer (PC). However, this only indicates one way of carrying out the present invention as an example, and the present invention is not limited to the exemplary embodiments that will be described below.

FIG. 1A is a block diagram illustrating a hardware configuration of an image processing apparatus 100 according to a first exemplary embodiment.

In FIG. 1A, the image processing apparatus 100 includes a central processing unit (CPU) 101, a random access memory (RAM) 102, a read only memory (ROM) 103, a secondary storage device 104, an interface (IF) 105, an IF 106, and a video card 107. The respective functional blocks are connected to one another via a system bus 112.

The image processing apparatus 100 can be realized by, for example, installing image processing application software (a program) for performing processing that will be described below into a general-purpose PC.

The CPU 101 performs the processing that will be described below according to the program. The ROM 103 stores a program such as the application to be executed by the CPU 101, which will be described below. The RAM 102 provides a memory for temporarily storing various kinds of information when the CPU 101 executes the program. The secondary storage device 104 is a hard disk drive (HDD), a flash memory, or the like, and is a storage medium for storing a database and the like that store an image file and a result of image analysis.

Further, a mouse 108 and a keyboard 109 are connected to the image processing apparatus 100 via the IF 105. The mouse 108 and the keyboard 109 are input devices that allow a user to input an instruction or the like for image correction processing.

Further, the image processing apparatus 100 is connected to a printer 110, which is a printing apparatus, via the IF 106. Further, a monitor 111 that allows the user to evaluate an image before and after the correction is connected to the image processing apparatus 100 via the video card 107.

In the following description, an overall configuration of image processing for fisheye processing according to the present exemplary embodiment will be described with reference to FIG. 1B. Respective blocks illustrated in FIG. 1B indicate units, each of which corresponds to each kind of processing according to the program.

First, an input image 200 is input into the image processing apparatus 100. The input image 200 is digital image data captured by an imaging apparatus. More specifically, examples of the input image 200 include digital image data captured by a digital camera with use of a normal lens, and digital image data obtained by optically scanning a film image captured by an analog camera. The input image 200, that is, a processing target image is not limited thereto, and may be image data other than the image captured by the imaging apparatus. A data format of the input image 200 is not especially limited. In the present exemplary embodiment, for simplification of the description, assume that a color space of the input image 200 is standard red-green-blue (sRGB), and each pixel value is constituted by RGB component values of 8 bits. Further, in the present exemplary embodiment, assume that the input image 200 is a rectangular image, and a result after the fisheye processing is also output as image data expressing a rectangular image.

The input image 200 is input into a reference point setting unit 201, and a reference point 301 is set in the input image 200. Then, the input image 200 with the reference point 301 set therein is input into a deformation processing unit 202, and is deformed with the reference point 301 used as a center in deformation.

Figure 2A:
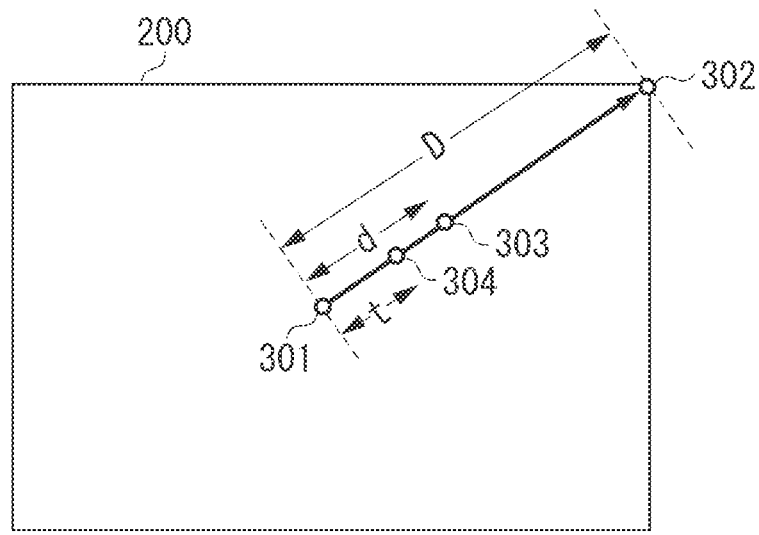
FIGS. 2A and 2B each illustrate a relationship among a reference point, a target position, and an acquisition position in an input image according to the first exemplary embodiment.
Figure 2B:
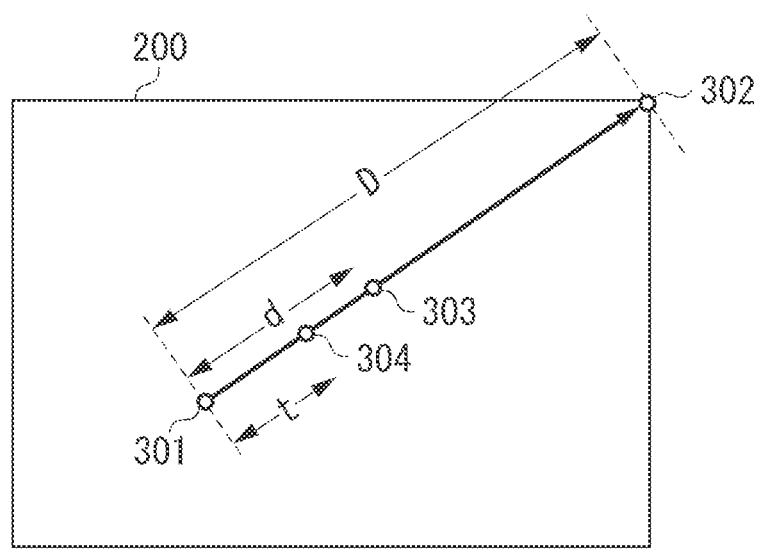

Now, processing for setting the reference point 301 by the reference point setting unit 201 will be described with reference to FIGS. 2A and 2B. FIGS. 2A and 2B each illustrate a relationship among the reference pint 301, a target position 303, and an acquisition position 304 in the input image 200.

In FIG. 2A, a vertex 302 of the input image 200 is a position located farthest away from the reference point 301 in the input image 200. This vertex 302 and the reference point 301 are spaced apart from each other by a distance D. Further, the target position 303 is a target position when image deformation processing is performed, and the acquisition position 304 is an acquisition position for the target position 303 when the image deformation processing is performed, as will be described in detail below. The reference point 301 and the target position 303 are spaced apart from each other by a distance d, and the reference point 301 and the acquisition position 304 are spaced apart from each other by a distance t.

As described above, the reference point setting unit 201 sets the reference point 301 in the input image 200. The method for setting the reference point 301 is not especially limited, and may be any method that can set a point usable as a reference in the input image 200. In FIG. 2A, the reference point 301 coincides with central coordinates of the input image 200 (a centroid of the input image 200).

The example illustrated in FIG. 2A has been described assuming that the reference point 301 is set to the center of the input image 200, but the reference point 301 may be set to another position than the center of the input image 200. For example, as illustrated in FIG. 2B, the reference point 301 may be set on the left side with respect to the center of the input image 200. If the reference point 301 is set on the lower left side with respect to the center of the input image 200 as illustrated in FIG. 2B, the farthest position away from the reference point 301 in the input image 200 would be the vertex 302 of the input image 200. FIG. 2B also illustrates the target position 303 and the acquisition position 304. Also in this case, the reference point 301 and the target position 303 are spaced apart from each other by the distance d, and the reference point 301 and the acquisition position 304 are spaced apart from each other by the distance t.

Figure 3:
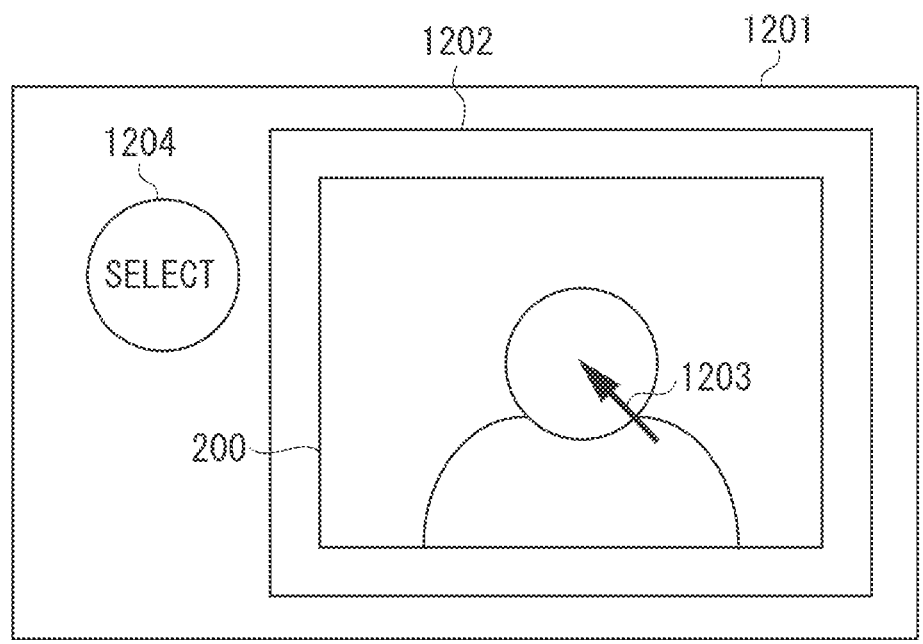
FIG. 3 illustrates an image display of an image processing application according to the first exemplary embodiment.

Now, the method for setting the reference point 301 by the reference point setting unit 201 will be described in more details with reference to FIG. 3. FIG. 3 illustrates an image for specifying the reference point 301 in the image processing application according to the present exemplary embodiment.

In FIG. 3, a main screen 1201 is displayed on the monitor 111 to be used in the fisheye processing of the image processing application. The main screen 1201 includes an image display portion 1202 of the image processing application, and an image selection button 1204 that allows the user to select an image to be subjected to the image processing. A mouse pointer 1203 that allows the user to specify the reference point 301 is displayed on the main screen 1201.

If the image processing application is activated, and an instruction for the fisheye processing or the like is issued, first, the main screen 1201 is displayed on the monitor 111 as illustrated in FIG. 3. When the user performs a selection operation of placing the mouse pointer 1203 onto the image selection button 1204 with use of the mouse 108, an image selection screen is displayed. When the user selects an image to be subjected to the image processing on the image selection screen, the selected image (the input image 200) is displayed in the image display portion 1202. The image is selected from image files stored in the secondary storage device 104.

Next, when the user arbitrarily clicks a position in the image display portion 1202 by the mouse pointer 1203, the reference point 301 is set to the clicked position. At this time, a coordinate position in the input image 200 that corresponds to the position clicked in the image display portion 1202 is calculated, and the calculated coordinate position is stored as the reference point 301.

In the present exemplary embodiment, the method for setting the reference point 301 has been described based on the example in which the user is supposed to set the reference point 301, but the method is not limited thereto. For example, the reference point 301 may be automatically set based on a result of image analysis, shooting information, or the like. If the reference point 301 is set based on a result of image analysis of the input image 200, the reference point 301 can be set by detecting an object from the input image 200 and selecting, for example, a center of the object as the reference point 301. On the other hand, if the reference point 301 is set based on shooting information of the input image 200, the reference point 301 can be set by acquiring the shooting information included in the input image 200 and selecting, for example, a focal position of the shooting information as the reference point 301. Further, information about a reference point set on the camera main body side when the input image 200 is captured may be acquired, and this reference point set on the camera main body side may be set as the reference point 301 when the image processing is performed.

In this manner, the reference point 301 may be arbitrarily set by the user, or may be automatically set based on predetermined information. Examples of the predetermined information include a center of an object, a center of a face of an object, a focal position, and a reference point set on the camera main body side, but the predetermined information is not limited thereto.

After the reference point setting unit 201 sets the reference point 301 by the above-described method, the deformation processing unit 202 deforms the input image 200 with use of the set reference point 301 as a center in the deformation. At this time, the deformation processing unit 202 advances the processing while shifting the target position 303. First, the deformation processing unit 202 identifies the distance d between the target position 303 and the reference point 301. Next, the deformation processing unit 202 identifies the acquisition position 304 corresponding to the target position 303 based on the distance d between the reference point 301 and the target position 303 according to a preset parameter. Then, the deformation processing unit 202 sets a pixel value of the acquisition position 304 as a pixel value of the target position 303 after the deformation processing. The deformation processing unit 202 deforms the image by repeating this processing as many times as the number of pixels in the input image 200.

A parameter for enlarging the vicinity of the center that surrounds the reference point 301 and reducing the vicinity of the periphery of the input image 200 is used as the preset parameter for calculating the acquisition position 304. An image as if it is captured via the fisheye lens in a curved manner can be generated by performing the deformation processing for enlarging the vicinity of the reference point 301 and reducing the vicinity of the periphery with use of such a parameter.

Next, the input image 200 on which the deformation processing has been performed by the deformation processing unit 202 is input into a sharpening processing unit 203.

The sharpening processing unit 203 locally performs sharpening processing. More specifically, the sharpening processing unit 203 performs filter processing while changing a strength S of the sharpening processing according to a resizing ratio R of the processing target image.

A ratio of the distance t between the reference point 301 and the acquisition position 304 to the distance d between the reference point 301 and the target position 303 (t/d) is used as the resizing ratio R of the image. In other words, the resizing ratio R of the image is determined for each target position 303. If the distance d is longer than the distance t, the pixel value of the acquisition position 304 is acquired from a pixel located closer to the reference point 301 than the target position 303 is to the reference point 301 so that the target position 303 is deformed into an enlarged region. On the other hand, if the distance d is shorter than the distance t, the pixel value of the acquisition position 304 is acquired from a pixel located farther away from the reference point 301 than the target position 303 is from the reference point 301 so that the target position 303 is deformed into a reduced region.

The strength S of the sharpening processing is calculated based on a preset parameter and the calculated resizing ratio R of the image. The parameter is set in such a manner that, if the resizing ratio R is low, that is, if the target position 303 is an enlarged region, the strength S of the sharpening processing has a positive value. When the strength S of the sharpening processing has a positive value, the sharpness increases so that the edge becomes enhanced. On the other hand, the parameter is set in such a manner that, if the resizing ratio R is high, that is, the target position 303 is a reduced region, the strength S of the sharpening processing has a negative value. When the strength S of the sharpening processing has a negative value, the sharpness decreases so that the edge becomes smooth.

In the present exemplary embodiment, unsharp mask processing with use of an average value filter is employed as the filter processing. More specifically, a mask value obtained by multiplying a pixel after the average value filter processing by the strength S of the sharpening processing corresponding to the resizing ratio R is added to the image after the deformation processing for each pixel. The mask value is added to the enlarged region where the strength S of the sharpening processing has a positive value, whereby the edge is enhanced. The mask value is subtracted from the reduced region where the strength S of the sharpening processing has a negative value, whereby the edge is smoothed. The above-described processing is repeated for each pixel.

In this manner, if the fisheye processing only includes simple enlargement and reduction by the deformation processing, a resultant image locally has an excessively enhanced edge or is locally blurred. The present exemplary embodiment calculates the strength S for each local position and performs the sharpening processing on such an image with different strengths S, thereby improving the uniformity in the degrees of edges throughout the entire image. In other words, the present exemplary embodiment can correct the deformed image closer to an image entirely in focus, which is an original characteristic of the actual fisheye lens.

The image after the sharpening processing is stored into the secondary storage device 104, is displayed on the monitor 111, or is printed on a recording medium such as paper by the printer 110, as an output image 204.

Figure 4:
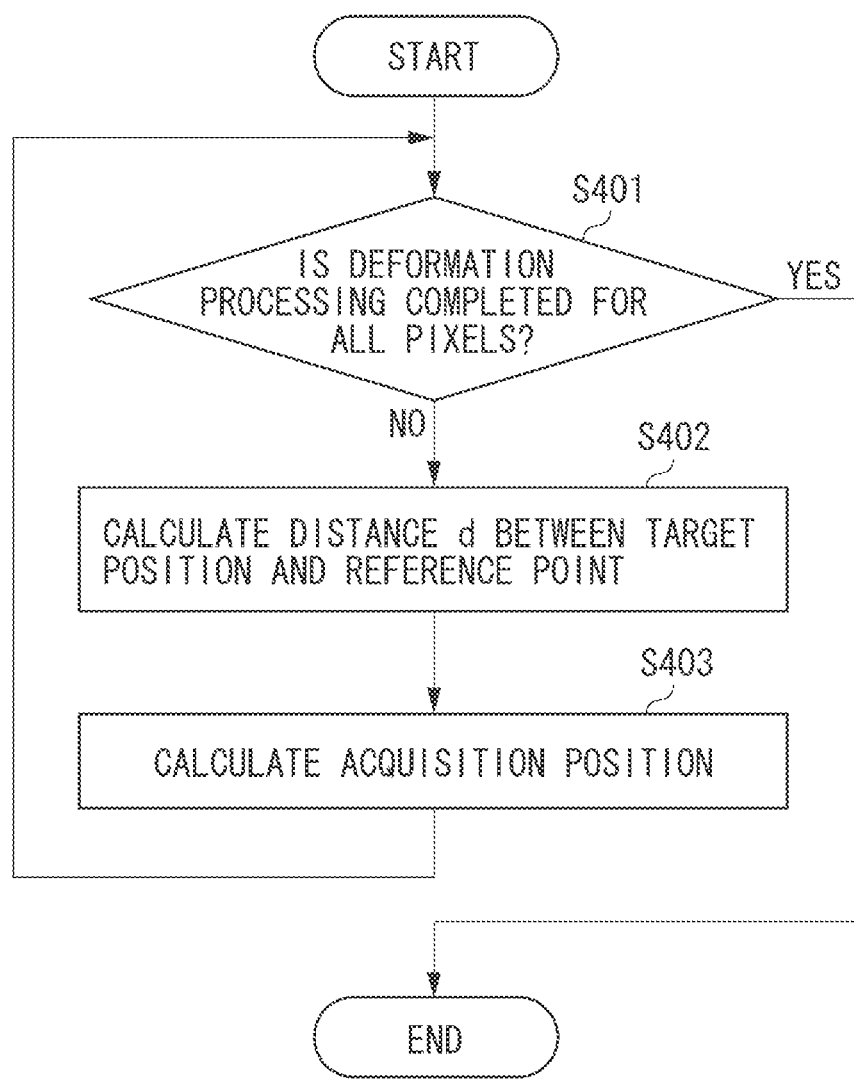
FIG. 4 illustrates a processing flow performed by a deformation processing unit according to the first exemplary embodiment.

FIG. 4 illustrates a processing flow performed by the deformation processing unit 202 by the CPU 101 loading the application stored in the ROM 103 into the RAM 102. At this time, the deformation processing unit 202 generates the deformed image by calculating the acquisition position 304 for each of all pixels in the input image 200 while changing the target position 303 for each pixel.

First, in step S401, the deformation processing unit 202 determines whether the deformation processing is completed for all of the pixels. In the present exemplary embodiment, the deformation processing unit 202 determines whether a pixel set as a previous processing target is the last pixel (an N-th pixel) assuming that the number of all pixels is N, and determines that the deformation processing is completed for all of the pixels if the pixel set as the previous processing target is the last pixel. If the deformation processing is not completed for all of the pixels (NO in step S401), the processing proceeds to step S402. If the deformation processing is completed for all of the pixels (YES in step S401), the deformation processing ends.

In step S402, the deformation processing unit 202 calculates the distance d between the target position 303, which is the pixel position of the processing target, and the reference point 301. Then, the processing proceeds to step S403.

In step S403, the deformation processing unit 202 calculates the acquisition position 304 corresponding to the target position 303 from the parameter for the deformation processing, which will be described below. Then, the deformation processing unit 202 sets the pixel of the acquisition position 304 corresponding to the distance t from the reference point 301 as the pixel after the deformation processing. After that, the processing returns to step S401.

Steps S401 to S403 are repeated for all of the pixels, and then the processing for all of pixels ends.

Figure 5:
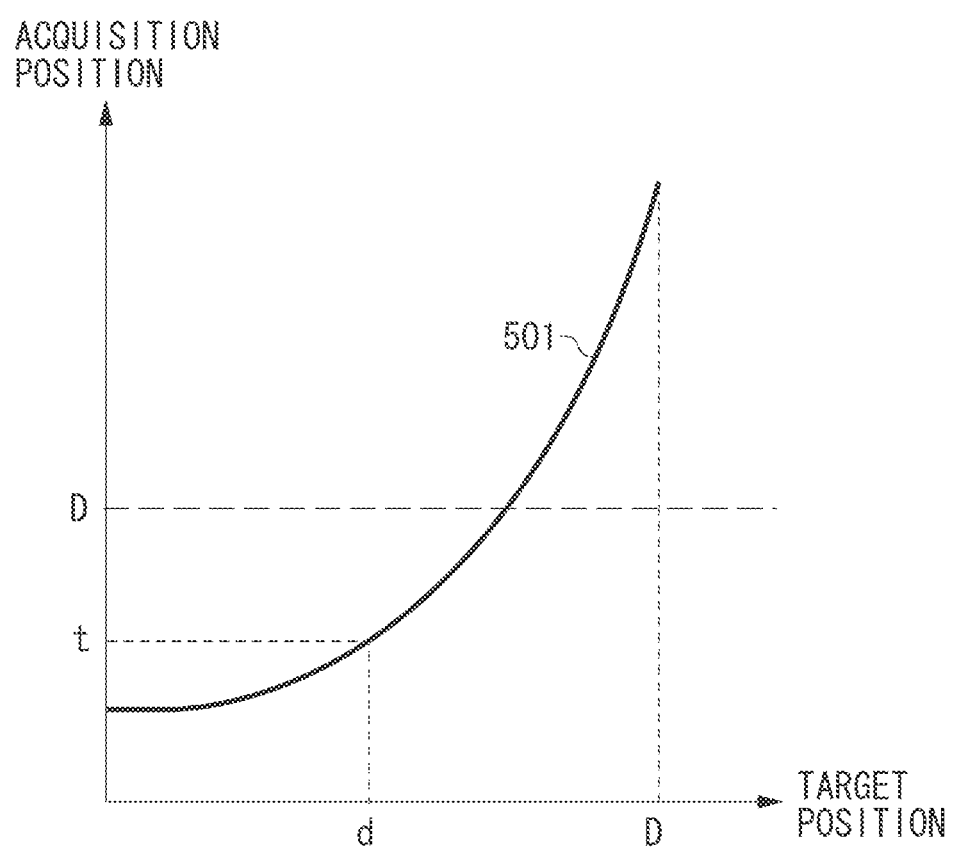
FIG. 5 illustrates an example of a parameter used in deformation processing according to the first exemplary embodiment.

Now, the parameter for the deformation processing will be described with reference to FIG. 5. FIG. 5 illustrates the parameter for the deformation processing. FIG. 5 illustrates the distance t between the reference point 301 and the acquisition position 304 with respect to the distance d between the reference point 301 and the target position 303. In other words, FIG. 5 illustrates the distance t of the acquisition position 304 from the reference point 301 with respect to the distance d of the target position 303 from the reference point 301. In FIG. 5, an origin corresponds to the reference point 301, and the distances d and t are variables, respectively. As described above, the acquisition position 304 is a position at which a pixel value is acquired for the target position 303 when the deformation processing is performed.

The parameter (a curved line 501) illustrated in FIG. 5 is calculated based on the distance D between the reference point 301 and the farthest point from the reference point 301 (the vertex 302 of the image) in the input image 200 with use of an equation prepared in advance.

In the present exemplary embodiment, the deformation processing unit 202 acquires the distance t of the acquisition position 304 from the reference point 301 with use of the following equations (1) and (2). In the following equations, e represents the distance d when the distance D is normalized into 1.0, and u represents the distance t when the distance D is normalized into 1.0.

$$u=0.5+e^2 \qquad \text{EQUATION (1)}$$

$$t=d\times u \qquad \text{EQUATION (2)}$$

For example, if the distances D and d are 100 and 50, respectively, 0.5 is obtained as the value of e, and 0.75 is obtained as the value of u from the equation (1). Then, 37.5 is obtained as the distance t from the equation (2).

The parameter for the deformation processing is not limited to the above-described parameter, and may be any parameter that can enlarge a region located close to the reference point 301 and reduce a region located away from the reference point 301 when the fisheye processing is performed.

Figure 6:
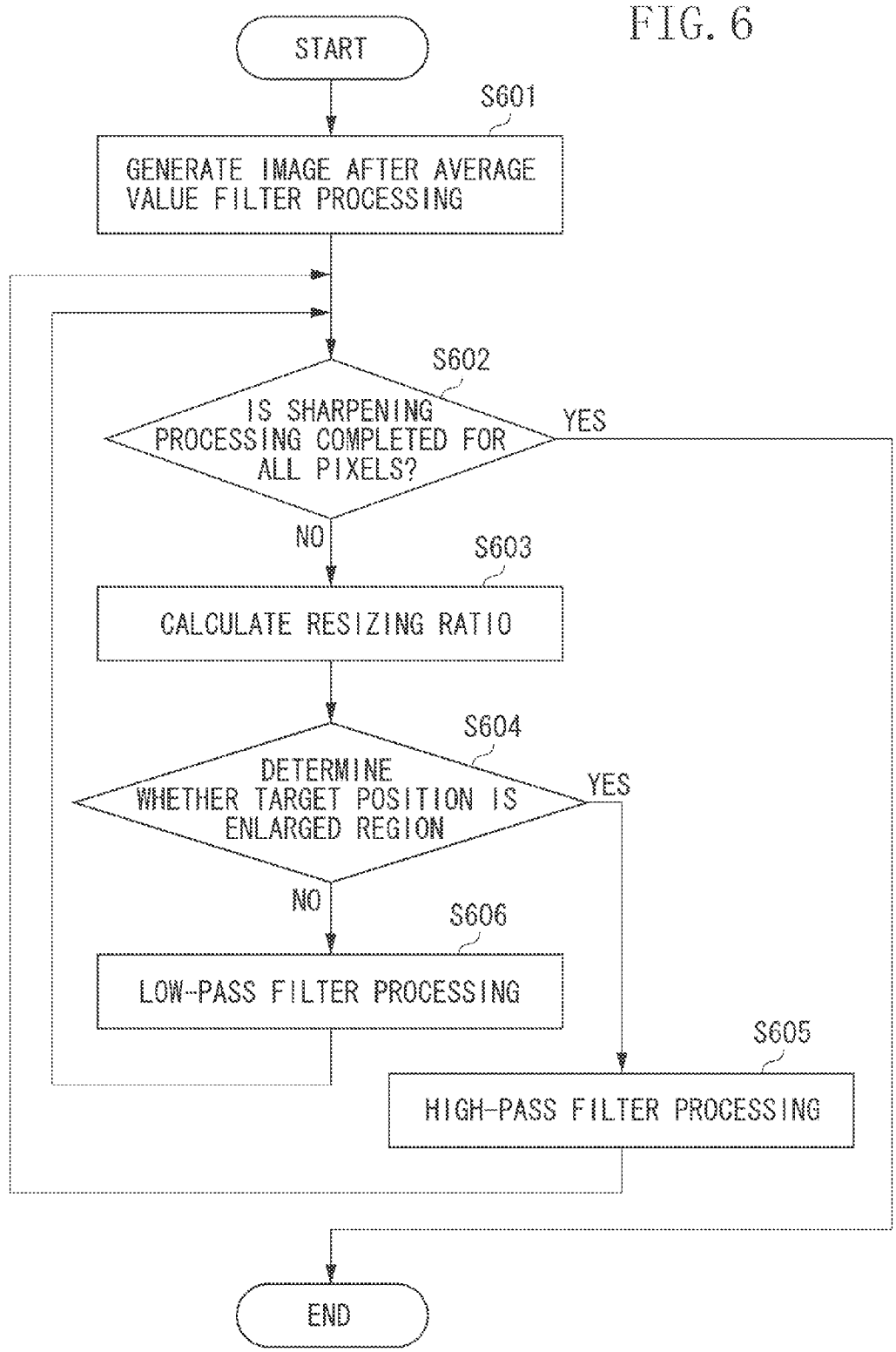
FIG. 6 illustrates a processing flow performed by a sharpening processing unit according to the first exemplary embodiment.

FIG. 6 illustrates a processing flow performed by the sharpening processing unit 203 by the CPU 101 loading the application stored in the ROM 103 into the RAM 102. The sharpening processing unit 203 calculates the resizing ratio R for each pixel, determines whether the target position 303 is an enlarged region according to the resizing ratio R, and switches high-pass filter processing and low-pass filter processing. In the high-pass filter processing, the sharpening processing unit 203 performs processing for emphasizing a high-frequency component of a spatial frequency of the input image 200, such as processing for attenuating a low-frequency component of the spatial frequency. In the low-pass filter processing, the sharpening processing unit 203 performs processing for emphasizing the low-frequency component of the spatial frequency of the input image 200, such as processing for attenuating the high-frequency component of the spatial frequency.

First, in step S601, the sharpening processing unit 203 performs the average value filter processing on the image having been subjected to the deformation processing by the deformation processing unit 202 for each predetermined pixel, thereby generating an image after the filter processing. In the present exemplary embodiment, the sharpening processing unit 203 performs the average value filter processing, which uses 3×3 pixels for each pixel, on all of the pixels in the image having been subjected to the deformation processing, thereby generating an image after the filter processing. The average value filter processing based on 3×3 pixels is processing for calculating an average value of a region defined by vertically arranged three pixels and horizontally arranged three pixels with a target pixel located at a center thereof, that is, nine pixels in total. For example, suppose that respective RGB component values of these nine pixels are (R, G, B) {(R1, G1, B1), (R2, G2, B2), (R3, G3, B3), (R4, G4, B4), (R5, G5, B5), (R6, G6, B6), (R7, G7, B7), (R8, G8, B8), (R9, G9, B9)}. In this case, the target pixel corresponds to (R5, G5, B5).

Then, RGB component values of the target pixel after the average value filter processing are calculated as {(R1+R2+R3+R4+R5+R6+R7+R8+R9)/9, (G1+G2+G3+G4+G5+G6+G7+G8+G9)/9, (B1+B2+B3+B4+B5+B6+B7+B8+B9)/9}.

In the present exemplary embodiment, the sharpening processing unit 203 uses the average value filter processing based on 3×3 pixels as the filter processing, but the filter processing used at this time is not limited thereto. The sharpening processing unit 203 may use any filter processing that can be utilized for realizing the high-pass filter processing and the low-pass filter processing in the sharpening processing that will be described below.

Next, the sharpening processing unit 203 performs the sharpening processing on all of the pixels in the image after the deformation processing, which is generated by the deformation processing unit 202, while shifting the target position 303.

In step S602, the sharpening processing unit 203 determines whether the sharpening processing is completed for all of the pixels. If the sharpening processing is completed for all of the pixels (YES in step S602), the sharpening processing ends. If the sharpening processing is not completed for all of the pixels (NO in step S602), the sharpening processing proceeds to step S603.

In step S603, the sharpening processing unit 203 calculates the resizing ratio R for each pixel. The sharpening processing unit 203 calculates the resizing ratio R of the image based on the distance d between the reference point 301 and the target position 303 and the distance t between the reference point 301 and the acquisition position 304. In the present exemplary embodiment, the ratio of the distance t between the reference point 301 and the acquisition position 304 to the distance d between the reference point 301 and the target position 303 is used as the resizing ratio R, as indicated by the following equation (3).

$$R=t/d \qquad \text{EQUATION (3)}$$

Use of the above-described equation (3) allows the resizing ratio R to indicate whether the target position 303 is enlarged or reduced. More specifically, if the distance t between the reference point 301 and the acquisition position 304 is shorter than the distance d between the reference point 301 and the target position 303, the resizing ratio R indicates that the target position 303 is enlarged. Further, if the distance t between the reference point 301 and the acquisition position 304 is longer than the distance d between the reference point 301 and the target position 303, the resizing ratio R indicates that the target position 303 is reduced.

In the present exemplary embodiment, the sharpening processing unit 203 performs the filter processing with use of the equation (3), but the method for calculating the resizing ratio R is not especially limited, as long as the value of the resizing ratio R can indicate the degree of deformation, like how much the target position 303 is enlarged or reduced. For example, the resizing ratio R may be handled as the distance t, if the deformation processing is such processing that the resizing ratio R is determined based on the distance t between the reference point 301 and the acquisition position 304.

Next, in step S604, the sharpening processing unit 203 determines whether the target position 303 is an enlarged region for each pixel with use of the resizing ratio R. In the present exemplary embodiment, the sharpening processing unit 203 determines that the target position 303 is an enlarged region if the resizing ratio R is 1.0 or lower, and determines that the target position 303 is a reduced region if the resizing ratio R is higher than 1.0. If the target position 303 is an enlarged region (YES in step S604), the sharpening processing proceeds to step S605. If the target position 303 is not an enlarged region (NO in step S604), the sharpening processing proceeds to step S606.

In step S605, the image after the deformation processing is assumed to be blurred, since the target position 303 is an enlarged region. Therefore, the sharpening processing unit 203 performs the high-pass filter processing for increasing the sharpness on the target position 303 in the image after the deformation processing.

Figure 7:
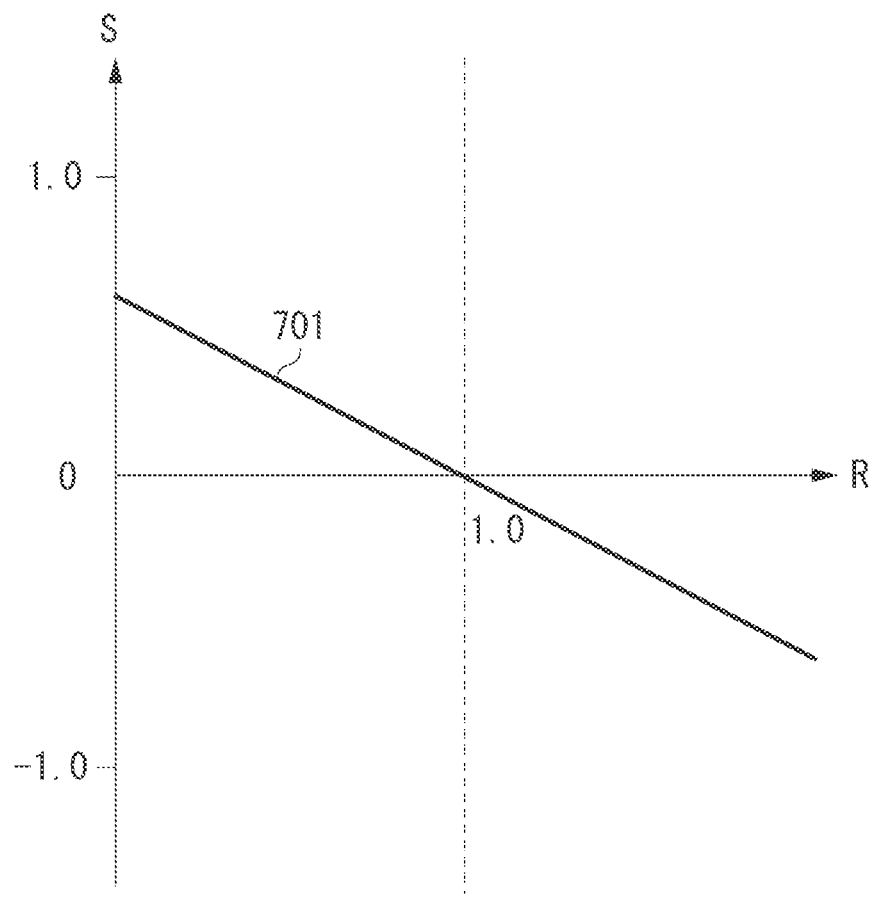
FIG. 7 illustrates an example of a parameter used in sharpening processing according to the first exemplary embodiment.

In the high-pass filter processing, the sharpening processing unit 203 uses the parameter for the strength S of the filter processing (the sharpening processing) based on the resizing ratio R illustrated in FIG. 7, and the result of the average value filter processing based on 3×3 pixels, which is calculated in step S601.

First, the parameter for the strength S of the filter processing will be described. FIG. 7 illustrates an example of the parameter for the sharpening processing. In FIG. 7, a straight line 701 represents the strength S of the sharpening processing according to the resizing ratio R in the deformation processing. As illustrated in FIG. 7, the straight line 701 is set in such a manner that the strength S decreases as the resizing ratio R increases. If the deformation processing is such processing that the resizing ratio R is determined based on the distance t between the reference point 301 and the acquisition position 304, the parameter can be provided by using a parameter in which the resizing ratio R is handled as the distance t, as the conversion processing parameter for the strength S of the sharpening processing based on the resizing ratio R illustrated in FIG. 7.

Then, for example, suppose that Ia is a pixel value corresponding to the target position 303 after the deformation processing, Ib is a pixel corresponding to the target position 303 after the average value filter processing, and Ic is a pixel corresponding to the target position 303 after the high-pass filter processing. In this case, the following equation (4) is used as the processing equivalent to the high-pass filter processing for increasing the sharpness.

$$Ic=Ia+Ib\times S \qquad \text{EQUATION (4)}$$

As indicated by the equation (4), the pixel Ic corresponding to the target position 303 after the high-pass filter processing is performed is calculated by adding the value obtained by multiplying the pixel after the average value filter processing by the strength S to the pixel value corresponding to the target position 303 after the deformation processing. For an enlarged region for which the resizing ratio R has a value of 1.0 or smaller, the strength S of the filter processing has a positive value. In other words, in the high-pass filter processing, a predetermined pixel is added to the pixel value corresponding to the target position 303 after the deformation processing. Since an enlarged region is blurred, it is desirable to enhance the edge to bring the image closer to such a state that the image is entirely in focus as if it is captured with use of the fisheye lens. In the present exemplary embodiment, the processing equivalent to the high-pass filter processing for enhancing the edge is performed by adding the pixel after the average value filter processing to the enlarged region. Therefore, the blurred state due to the enlargement processing can be corrected closer to an original flat state. After the processing of step S605, the sharpening processing returns to step S602.

In step S606, the image is assumed to have enhanced sharpness after the deformation processing, since the target position 303 is a reduced region. Therefore, the sharpening processing unit 203 performs the low-pass filter processing for decreasing the sharpness on the target position 303 in the image after the deformation processing.

In the low-pass filter processing, the sharpening processing unit 203 uses the parameter for the strength S of the filter processing based on the resizing ratio R illustrated in FIG. 7, and the result of the average value filter processing based on 3×3 pixels, which is calculated in step S601. At this time, the sharpening processing unit 203 uses the equation (4) as the processing equivalent to the low-pass filter processing for decreasing the sharpness, in a similar manner to the processing of step S605. As indicated by the equation (4), the pixel Ic corresponding to the target position 303 after the low-pass filter processing is performed is calculated by adding the value obtained by multiplying the pixel after the average value filter processing by the strength S to the pixel value corresponding to the target position 303 after the deformation processing. For a reduced region for which the resizing ratio R has a value larger than 1.0, the strength S of the filter processing has a negative value. In other words, in the low-pass filter processing, a predetermined pixel is subtracted from the pixel value corresponding to the target position 303 after the deformation processing. Since pixels are thinned out in a reduced region so that the edge is enhanced, it is desirable to perform blurring processing to bring the image closer to such a state that the image is entirely in focus as if it is captured with use of the fisheye lens. In the present exemplary embodiment, the processing equivalent to the low-pass filter processing for performing the blurring processing is performed by subtracting the pixel after the average value filter processing from the reduced region. Therefore, the edge enhanced state due to the reduction processing can be corrected closer to the original flat state. After the processing of step S606, the sharpening processing returns to step S602.

Steps S602 to S606 are repeated for all of the pixels, and then the sharpening processing ends.

In the present exemplary embodiment, the sharpening processing unit 203 generates the image after the average value filter processing based on 3×3 pixels in advance, and then adds or subtracts this value to realize the processing equivalent to the high-pass filter processing or the low-pass filter processing, thereby performing the sharpening processing. However, the sharpening processing is not limited thereto. The sharpening processing may be any processing that changes the enhancement of the edge and the strength of the blurring processing for each local position and makes the deformed image appear more like a result of shooting with use of the fisheye lens. For example, the sharpening processing unit 203 may prepare two filters, that is, an edge enhancement filter equivalent to the high-pass filter, and blurring processing filter equivalent to the low-pass filter in advance. Then, the sharpening processing unit 203 may switch the high-pass filter processing with use of the edge enhancement filter and the low-pass filter processing with use of the blurring processing filter according to the resizing ratio R, and change a filter strength and a filter size according to the strength S of the sharpening processing based on the resizing ratio R.

The image after the sharpening processing is performed by the sharpening processing unit 203 is output as the output image 204. This output image 204 can be stored into the secondary storage device 104, can be displayed on the monitor 111, and can be printed on a recording medium by the printer 110.

Normally, the fisheye lens has an extremely large depth of field, and the user performs shooting in such a state that an entire region to be captured can be easily placed into focus when performing shooting with use of the fisheye lens. In other words, an image is formed with the entire region less defocused. Therefore, it is necessary to reproduce such a state that the captured region is entirely in focus to make the image appear more like the result of shooting with use of the fisheye lens. However, the attempt to reproduce the result of shooting with use of the fisheye lens from an image captured with use of the normal lens has conventionally led to generation of an image locally blurred yet having an enhanced edge conversely under the influence of the deformation processing, since the image is enlarged and reduced with the reference point used as the center in the deformation. On the other hand, the present exemplary embodiment calculates the strength S for each local position and performs the sharpening processing on the image locally having an enhanced edge or locally blurred due to the deformation processing, thereby improving the uniformity in the degrees of edges throughout the entire image. In other words, the present exemplary embodiment corrects the local blurring and the edge enhancement, which are generated due to the deformation processing including the enlargement processing and the reduction processing with different resizing ratios, by the sharpening processing. As a result, the present exemplary embodiment can correct the deformed image closer to an image entirely in focus throughout region.

The present exemplary embodiment can perform desired deformation processing while suppressing local blurring and excessive edge enhancement, regardless of the position of the processing center for the fisheye processing, that is, even when the processing center for the fisheye processing is set to another point than the center of the image. Therefore, the present exemplary embodiment can set an object position desired by the user as the center of the distortion (the processing center for the fisheye processing), and obtain a desired fisheye-like effect. For example, the present exemplary embodiment can set a center of an object, a center of a face of the object, a predetermined part of the object, or the like in an image as the center of the distortion, and perform desired deformation processing while suppressing local blurring and excessive edge enhancement.

Further, the present exemplary embodiment generates the image after the average value filter processing in advance, and can realize the high-pass filter processing and the low-pass filter processing only by adding and subtracting the pixel after the average value filter processing. Therefore, the present exemplary embodiment can make the deformed image appear more like the result of shooting with use of actual the fisheye lens, by high-speed processing.

A second exemplary embodiment will be described with reference to FIGS. 8 to 11. The present exemplary embodiment will be described while omitting redundant descriptions about configurations similar to those in the first exemplary embodiment. In the following description, the present exemplary embodiment will be described based on the example in which the present invention is carried out by means of the image processing application executed on the personal computer. However, this only indicates one way of carrying out the present invention as an example, and the present invention is not limited to the exemplary embodiment that will be described below.

The first exemplary embodiment initially performs the deformation processing for enlarging and reducing the image captured with use of the normal lens while locally changing the resizing ratio R. Then, the first exemplary embodiment corrects such phenomena that the image is locally blurred and the edge is locally enhanced, which occur due to the deformation processing, by controlling the sharpening processing according to the resizing ratio R. In other words, the first exemplary embodiment makes the deformed image appear more like the result of shooting with use of the fisheye lens by cancelling the influence generated when the deformation processing is performed.

On the other hand, the present exemplary embodiment makes the deformed image appear more like the result of shooting with use of the fisheye lens by further performing locally adjusted sharpening processing in consideration of a lens characteristic.

Figure 8:
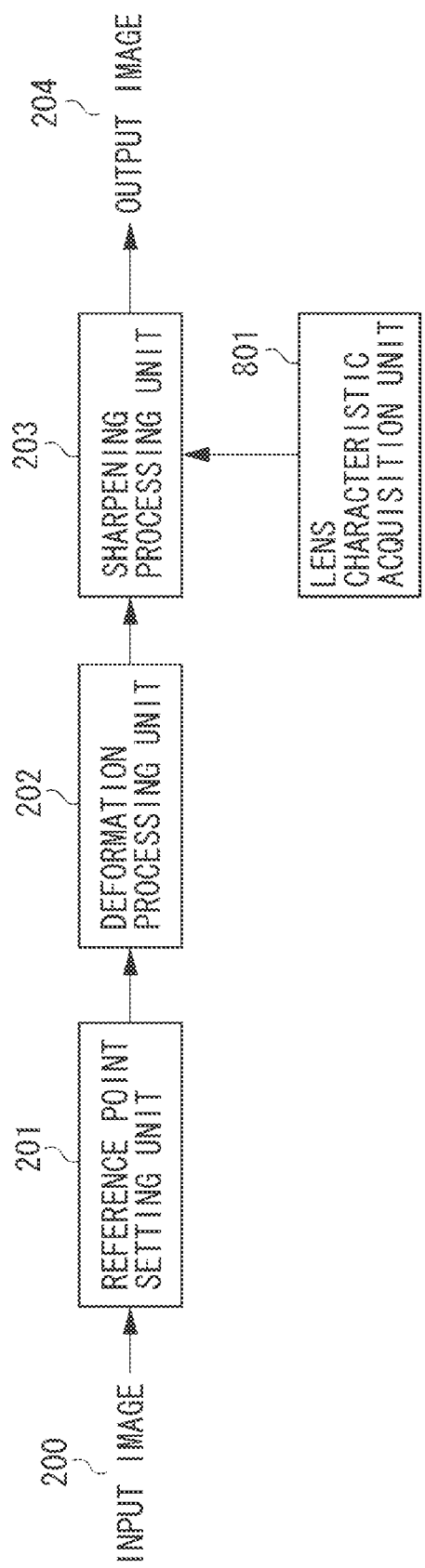
FIG. 8 is a block diagram illustrating functional blocks of an image processing apparatus according to a second exemplary embodiment.

In the following description, an overall configuration of image processing according to the present exemplary embodiment will be described with reference to FIG. 8.

First, the input image 200 is input into the reference point setting unit 201. Then, the reference point setting unit 201 sets the reference point 301. Because the reference point setting unit 201 is similar to that in the first exemplary embodiment, a description thereof is omitted here.

Next, the deformation processing unit 202 performs the deformation processing on the input image 200 while shifting the target position 303 for each pixel. Because the deformation processing unit 202 is similar to that in the first exemplary embodiment, a description thereof is omitted here.

Next, a lens characteristic acquisition unit 801 acquires lens information for identifying a lens characteristic of a lens used when the input image 200 is captured. The lens characteristic acquisition unit 801 is a processing unit that acquires the lens information for identifying the lens characteristic when the input image 200 is captured. Examples of the lens characteristic include a modulation transfer function (MTF) characteristic. The MTF characteristic indicates a characteristic value evaluated by a lens performance evaluation method based on a contrast reproduction ratio, and is expressed by a change amount of contrast C with respect to a distance L from the center of the lens.

The lens information for identifying the lens characteristic, which is acquired by the lens characteristic acquisition unit 801, is input into the sharpening processing unit 203. The sharpening processing unit 203 performs filter processing in which the strength of the sharpening processing is changed in consideration of the resizing ratio R of the image and the lens characteristic. In other words, the sharpening processing unit 203 according to the present exemplary embodiment calculates the strength of the sharpening processing based on the resizing ratio R of the image and the lens characteristic, and then performs the filter processing.

As the filter processing according to the present exemplary embodiment, the sharpening processing unit 203 performs filter processing for setting the strength of the sharpening processing based on an acquired filter characteristic and increasing the sharpness as the target pixel is located farther away from the center of the image, in addition to the processing similar to that in the first exemplary embodiment. In other words, according to the present exemplary embodiment, the sharpening processing unit 203 performs the sharpening processing in consideration of an originally existing blurring of an object in the image captured with use of the normal lens in addition to the local blurring and the local edge enhancement generated due to the deformation of the image. Because the resizing ratio R of the image is similar to that in the first exemplary embodiment, a description thereof is omitted here.

Figure 9:
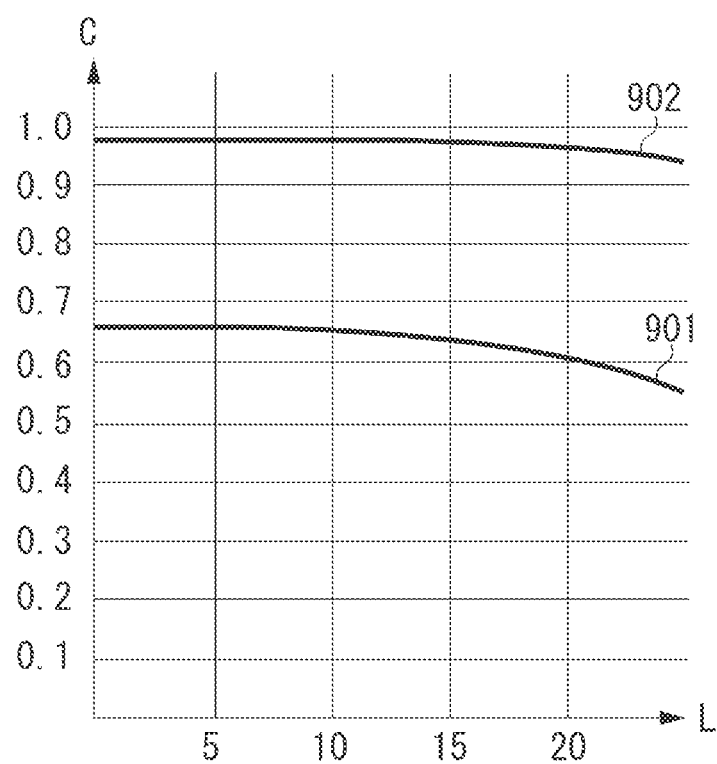
FIG. 9 illustrates a lens characteristic according to the second exemplary embodiment.

Now, the lens characteristic acquisition unit 801 will be described in detail with reference to FIG. 9. FIG. 9 illustrates the lens characteristic when the input image 200 is captured, which is acquired by the lens characteristic acquisition unit 801. The lens characteristic illustrated in FIG. 9 is the above-described MTF characteristic. A horizontal axis represents the distance L from the center of the lens, and a vertical axis represents the contrast C. In other words, FIG. 9 illustrates a graph that indicates the change amount of the contrast C with respect to the distance L from the center of the lens. For example, an MTF characteristic 901 corresponds to a characteristic of a standard lens, and an MTF characteristic 902 corresponds to a characteristic of a high-grade lens. As illustrated in FIG. 9, the MTF characteristic 901 of the standard lens is characterized in that, as compared to the MTF characteristic 902 of the high-grade lens, the contrast C is more likely to decrease as the distance L from the center of the lens increases, so that blurring is more likely to occur. The sharpening processing unit 203 performs the sharpening processing in consideration of the MTF characteristic. In the present exemplary embodiment, the MTF characteristic is registered for each lens in advance. Then, if a lens type is input, the lens characteristic acquisition unit 801 acquires the MTF characteristic corresponding to the input lens type. The method for acquiring the lens information for identifying the lens characteristic is not especially limited, and may be any method that can acquire the lens information for identifying the lens characteristic corresponding to the input image 200 when the image is captured. For example, several kinds of MTF characteristics from the MTF characteristic corresponding to the standard lens to the MTF characteristic corresponding to the high-grade lens may be registered, and they may be switched by specifying the type or the level, or may be switched based on lens information included in the input image 200. Alternatively, the present exemplary embodiment may be configured to request the user to input the input image 200 and a conversion table indicating the MTF characteristic corresponding to the input image 200 together, when inputting the image.

Now, the processing performed by the sharpening processing unit 203 according to the present exemplary embodiment will be described in detail. The sharpening processing unit 203 according to the present exemplary embodiment calculates the strength of the sharpening processing with use of the resizing ratio R of the image and the lens characteristic, and performs the filter processing while changing the strength of the sharpening processing.

Figure 10:
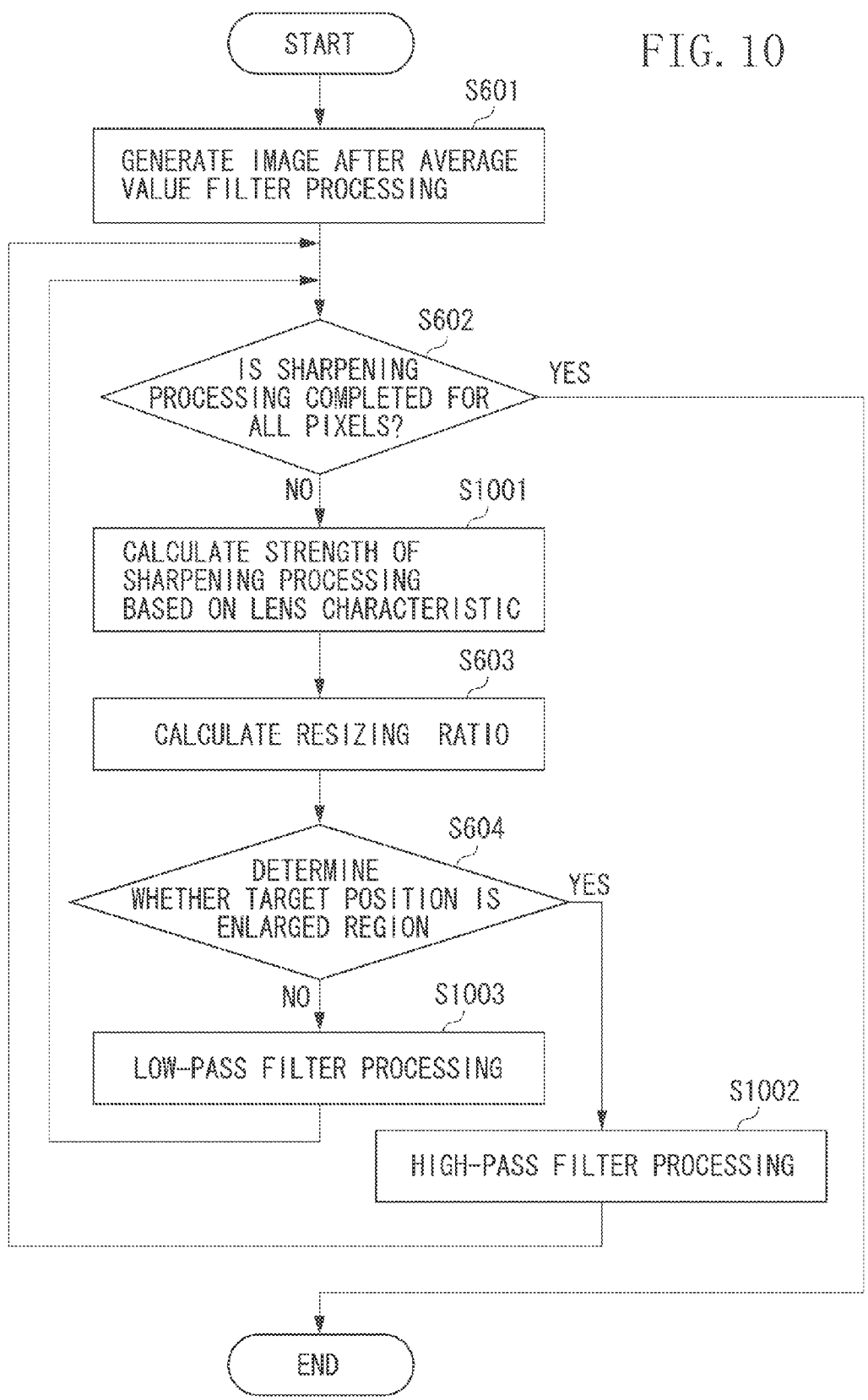
FIG. 10 illustrates a processing flow performed by a sharpening processing unit according to the second exemplary embodiment.

FIG. 10 illustrates a processing flow performed by the sharpening processing unit 203 by the CPU 101 loading the application stored in the ROM 103 into the RAM 102. Operations similar to those in the first exemplary embodiment are assigned the same step numbers as those in the first exemplary embodiment, and descriptions thereof will be omitted below.

First, in step S601, the sharpening processing unit 203 performs the average value filter processing on the image after the deformation processing, which is generated by the deformation processing unit 202, for each pixel.

Next, in step S602, the sharpening processing unit 203 determines whether the sharpening processing is completed for all of the pixels. If the sharpening processing is not completed for all of the pixels (No in step S602), the sharpening processing proceeds to step S1001. If the sharpening processing is completed for all of the pixels (YES in step S602), the sharpening processing ends.

In step S1001, the sharpening processing unit 203 calculates a strength P of the sharpening processing based on the lens characteristic for each pixel. More specifically, first, the sharpening processing unit 203 identifies a distance u from the center of the input image 200 to the acquisition position 304 corresponding to the target position 303. Then, the sharpening processing unit 203 calculates the strength P of the sharpening processing that corresponds to the distance u according to a parameter prepared in consideration of the lens characteristic.

Figure 11:
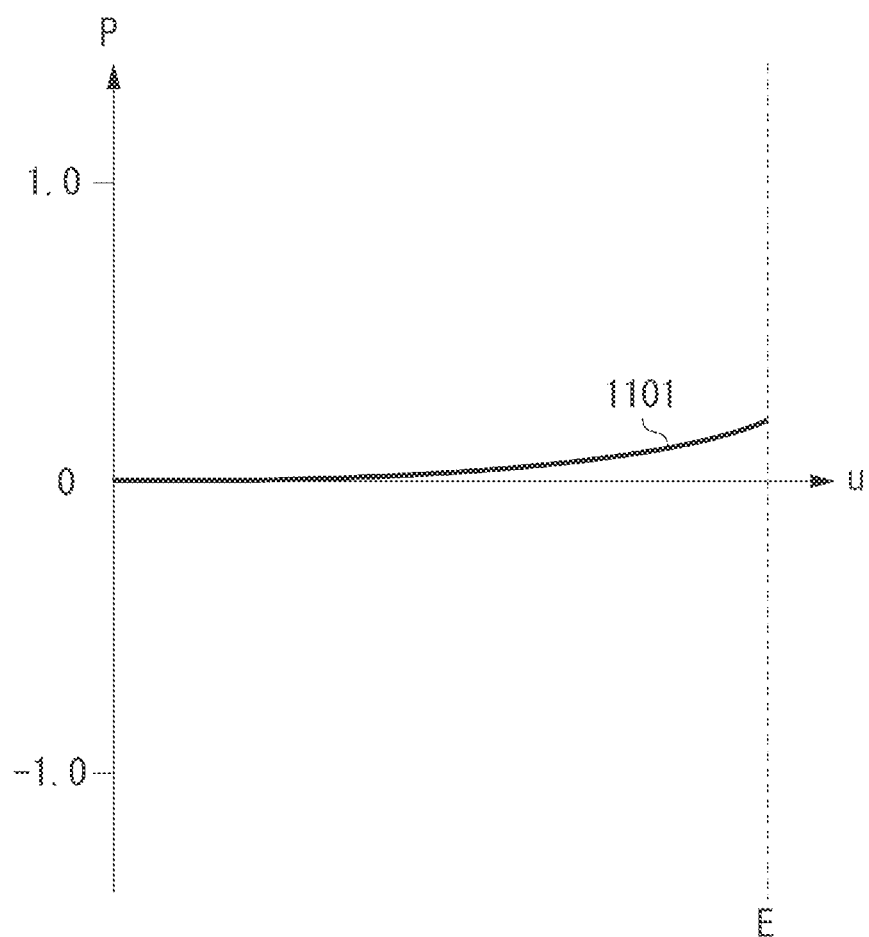
FIG. 11 illustrates an example of a parameter used in sharpening processing according to the second exemplary embodiment.

FIG. 11 illustrates an example of the sharpening processing parameter prepared in consideration of the lens characteristic, which is used by the sharpening processing unit 203 according to the present exemplary embodiment. A vertical axis represents the strength P of the sharpening processing, and a horizontal axis represents the distance u from the center of the input image 200 to the acquisition position 304.

The strength P of the sharpening processing varies according to the distance u from the center of the input image 200, as indicated by a curved line 1101 illustrated in FIG. 11. The curved line 1101 illustrated in FIG. 11 is set based on the acquired lens characteristic. In the present exemplary embodiment, the calculation of the strength P will be described assuming that the acquired lens characteristic is the MTF characteristic 901 illustrated in FIG. 9. Referring to FIG. 11, suppose that E represents a distance from the center of the input image 200 to a vertex of the image that is located farthest away from the center with the distance u maximized, and Lmax represents a position on the MTF characteristic 901 that is located farthest away from the center of the lens. The strength P of the sharpening processing that corresponds to the distance E on the curved line 1101 illustrated in FIG. 11 is a value obtained by multiplying a conversion value Q, which is acquired with use of the MTF characteristic calculated at the position Lmax, by a coefficient K.

Assuming that $C_0$ represents a contrast value when the distance L is zero, and $C_u$ represents a contrast value when the distance L is the distance u, the conversion value Q acquired with use of the MTF characteristic can be calculated with use of the following equation (5).

$$Q = (C_0 - C_u) \quad \text{EQUATION (5)}$$

Then, the strength P of the sharpening processing is calculated with use of the following equation (6). In the following equation, K represents a preset arbitrary coefficient.

$$P = Q \times K \quad \text{EQUATION (6)}$$

For example, suppose that 0.65 is the contrast value $C_0$ when the distance L is zero, 0.60 is the contrast value $C_u$ when the distance L corresponds to the distance u, and 2.0 is set as the coefficient K. In this case, the conversion value Q acquired with use of the MTF characteristic is calculated as Q=(0.65−0.60)=0.05, and the strength P of the sharpening processing that corresponds to the distance u is calculated as P=0.05× 2.0=0.1.

After the sharpening processing unit 203 calculates the strength P of the sharpening processing based on the lens characteristic in step S1001, the sharpening processing proceeds to step S603, in which the sharpening processing unit 203 calculates the resizing ratio R for each pixel. Because the calculation of the resizing ratio R is similar to that in the first exemplary embodiment, a description thereof is omitted here.

Next, in step S604, the sharpening processing unit 203 determines whether the target position 303 is an enlarged region with use of the resizing ratio R for each pixel. If the target position 303 is an enlarged region (YES in step S604), the sharpening processing proceeds to step S1002. If the target position 303 is not an enlarged region (NO in step S604), the sharpening processing proceeds to step S1003.

In step S1002, the sharpening processing unit 203 performs the high-pass filter processing. At this time, the sharpening processing unit 203 takes into consideration the fact that the image after the deformation processing is blurred since the target position 303 is an enlarged region, in a similar manner to the first exemplary embodiment, and also takes into consideration the possibility that the pixel of the acquisition position 304 acquired for the target position 303 may be blurred due to the lens characteristic. More specifically, the sharpening processing unit 203 performs the filter processing with use of the strength P of the sharpening processing that is determined in consideration of the lens characteristic, in addition to the strength S of the sharpening processing that is calculated by a similar method to that in the first exemplary embodiment.

In the filter processing, in a similar manner to the first exemplary embodiment, the sharpening processing unit 203 uses the result of the average value filter processing based on 3×3 pixels, which is calculated in advance. Suppose that Ia is the pixel value corresponding to the target position 303 after the deformation processing, Ib is the pixel corresponding to the target position 303 after the average value filter processing, and Ic is the pixel corresponding to the target position 303 after the present filter processing. In this case, in the filter processing according to the present exemplary embodiment, the sharpening processing unit 203 uses the following equation (7) as the processing equivalent to the high-pass filter processing for increasing the sharpness according to the resizing ratio R, and the processing for increasing the sharpness in consideration of the lens characteristic.

$$Ic = Ia + Ib \times (S + P) \quad \text{EQUATION (7)}$$

If the pixel of the acquisition position 304 is located away from the center of the image, it is desirable to enhance the edge also in the enlarged region because the original image should be blurred to some extent in this case, regardless of whether this position is an enlarged region. Further, because an enlarged region is blurred, it is desirable to enhance the edge to bring the image closer to such a state that the image is entirely in focus as if it is captured with use of the fisheye lens.

In the sharpening processing according to the present exemplary embodiment, the sharpening processing unit 203 adds the pixel after the average value filter processing to a pixel located away from the center of the image, and further adds the pixel after the average value filter processing to an enlarged region. The processing equivalent to the high-pass filter processing for enhancing the edge is performed in this manner. According to the present exemplary embodiment, the sharpening processing unit 203 performs the sharpening processing designed in consideration of such a state that the image is originally blurred in the first place and such a state that the image is blurred due to the enlargement processing, thereby enabling the deformed image to be closer to an image entirely in focus, which is the characteristic of the fisheye lens.

On the other hand, in step S1003, in a similar manner to the first exemplary embodiment, the sharpening processing unit 203 takes into consideration the fact that the edge is enhanced in the image after the deformation processing since the target position 303 is a reduced region. The sharpening processing unit 203 further takes into consideration the possibility that the pixel of the acquisition position 304 acquired for the target position 303 may be blurred due to the lens characteristic.

Therefore, the sharpening processing unit 203 performs the filter processing with use of the strength P of the sharpening processing that is determined in consideration of the lens characteristic, in addition to the strength S of the sharpening processing that is calculated by a similar method to that in the first exemplary embodiment. In the filter processing, the sharpening processing unit 203 uses the equation (7) in a similar manner to step S1002.

If the pixel of the acquisition position 304 is located away from the center of the image, the original image should be blurred to some extent regardless of whether this position is a reduced region. Therefore, it is desirable to enhance the edge. On the other hand, since pixels are thinned out in a reduced region so that the edge is enhanced, it is desirable to perform the blurring processing to bring the image closer to such a state that the image is entirely in focus as if it is captured with use of the fisheye lens.

In the sharpening processing according to the present exemplary embodiment, the sharpening processing unit 203 performs the processing equivalent to the high-pass filter processing for enhancing the edge by adding the pixel after the average value filter processing to a pixel located away from the center of the image. Further, the sharpening processing unit 203 performs the processing equivalent to the low-pass filter processing for performing the blurring processing by subtracting the pixel after the average value filter processing from a reduced region. In other words, according to the present exemplary embodiment, the sharpening processing unit 203 performs the sharpening processing designed in consideration of such a state that the image is originally blurred in the first place and such a state that the edge is enhanced due to the reduction processing, thereby enabling the deformed image to be closer to an image entirely in focus, which is the characteristic of the fisheye lens.

Steps S602 to S604 and S1001 to S1003 are repeated for all of the pixels, and then the sharpening processing ends.

In the first place, the image captured with use of the normal lens tends to be increasingly blurred as the position gets closer to the periphery of the image due to the lens characteristic unless this lens is the high-grade lens. Therefore, the present exemplary embodiment performs the sharpening processing while calculating the strength P for each local position in consideration of the lens characteristic when the input image 200 is captured, in addition to the processing according to the first exemplary embodiment. As a result, the present exemplary embodiment can improve the uniformity in the degrees of edges throughout the entire image. In other words, the present exemplary embodiment can correct the deformed image closer to an image entirely in focus, which is the original characteristic of the actual fisheye lens.

Further, the present exemplary embodiment performs the high-pass filter processing and the low-pass filter processing, and also performs the sharpening processing designed in consideration of the lens characteristic, thereby enabling the deformed image to appear more like the result of shooting with use of the fisheye lens, by the high-speed processing.

A third exemplary embodiment will be described with reference to FIGS. 12 to 17. The present exemplary embodiment will be described while omitting redundant descriptions about configurations similar to those in the first exemplary embodiment. In the following description, the present exemplary embodiment will be described based on the example in which the present invention is carried out by means of the image processing application executed on the personal computer. However, this only indicates one way of carrying out the present invention as an example, and the present invention is not limited to the exemplary embodiment that will be described below.

Figures 12A, 12B:
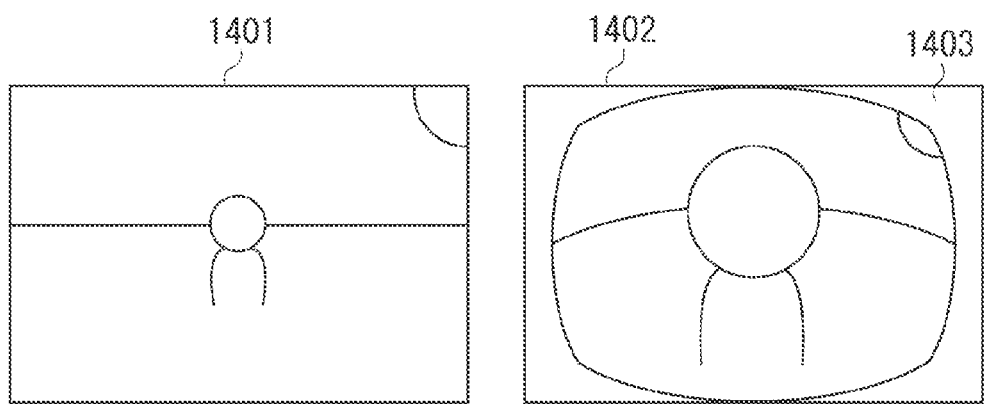
FIGS. 12A and 12B respectively illustrate how an image appears before and after deformation processing.

The first and the second exemplary embodiments perform the deformation processing on the image captured with use of the normal lens, and perform the processing for making the deformed image appear more like the image captured with use of the fisheye lens. Since these exemplary embodiments enlarge a region located close to the reference point 301 and reduce a region located away from the reference point 301 while using the reference point 301 as the center in the deformation during this deformation processing, the input image 200 is changed into an image distorted circularly about the reference point 301. Therefore, if the deformed image is arranged so as to be fitted into the size of the original input image 200, the deformed image has to include pixels that do not exist in the original input image 200 as pixels near the vertexes of the image. FIGS. 12A and 12B illustrate how the image appears before and after the deformation processing. An image 1401 indicates how the input image 200 appears before the deformation processing. An image 1402 indicates how the input image 200 appears after the deformation processing according to the present exemplary embodiment, and more specifically, indicates how the input image 200 appears after the deformation processing for enlarging the center and reducing the periphery with the center of the image set as the reference point 301 is performed on the input image 1401 before the deformation processing. A region 1403 is a region which does not include any of the pixels existing in the image before the deformation processing, after the deformation processing. The ends of the image are curved as illustrated in FIG. 12B by performing the deformation processing on the image 1401 with the center of the image set as the reference point 301. Then, if the image after the deformation processing is arranged so as to be fitted into the size of the input image 200, the region 1403, which does not include any of the pixels existing in the image before the deformation processing is generated in the image 1402 as illustrated in FIG. 12B. In other words, the first and the second exemplary embodiments can acquire an image as if it is captured with use of a circular fisheye lens having a shorter image circle diameter than both of horizontal and vertical diagonal lines of a screen. In this case, the first and the second exemplary embodiments generate the image 1402 by, for example, handling the pixel value (R, G, B) as (0, 0, 0) in the region that does not include any of the pixels existing in the image before the deformation processing.

This image 1402 after the deformation processing can be printed by a printing apparatus such as the printer 110 while being kept in this state, but a printing result includes the region 1403 where there is no pixel.

Therefore, the present exemplary embodiment performs image processing for generating an output image that does not include the region 1403, which does not include any of the pixels existing in the image before the deformation processing, on the image having been subjected to the deformation processing performed with the reference point 301 used as the center in the deformation.

Figure 13A:
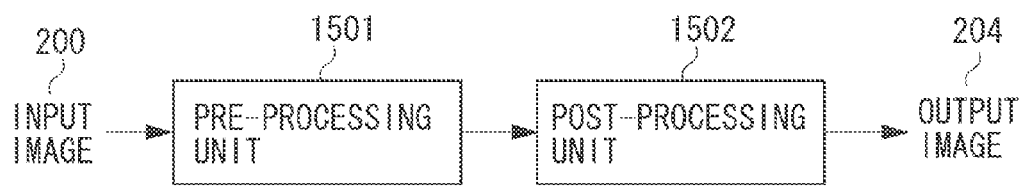
FIGS. 13A and 13B are functional block diagrams each illustrating a processing flow according to a third exemplary embodiment.
Figure 13B:
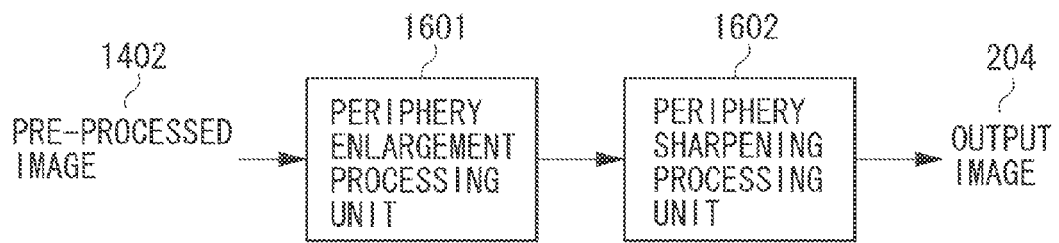

In the following description, an overall configuration of image processing according to the present exemplary embodiment will be described with reference to FIGS. 13A and 13B. Descriptions of processing similar to the first and the second exemplary embodiments will be omitted here. FIGS. 13A and 13B are block diagrams each illustrating a processing flow according to the present exemplary embodiment.

The image processing according to the present exemplary embodiment includes a pre-processing unit 1501 and a post-processing unit 1502 illustrated in FIG. 13A.

The pre-processing unit 1501 is a processing block that sets the reference point 301 in the input image 200, performs the deformation processing while using the reference point 301 as the center in the deformation, and performs the sharpening processing on the image having been subjected to the deformation processing.

The pre-processing unit 1501 can be configured in a similar manner to the first or the second exemplary embodiment. If the pre-processing unit 1501 is configured in a similar manner to the first exemplary embodiment, the pre-processing unit 1501 includes the reference point setting unit 201, the deformation processing unit 202, and the sharpening processing unit 203. If the pre-processing unit 1501 is configured in a similar manner to the second exemplary embodiment, the pre-processing unit 1501 includes the reference point setting unit 201, the deformation processing unit 202, the sharpening processing unit 203, and the lens characteristic acquisition unit 801. Because operations of the respective processing units are similar to those in the first or the second exemplary embodiment, descriptions thereof are omitted here.

The image processed by the pre-processing unit 1501 is deformed so as to be fitted into the image size of the input image 200, and is, for example, an image in which a pixel non-existent in the input image 200 is included near the vertex 302 of the image.

The post-processing unit 1502 is a processing block that performs enlargement processing on the image generated by the pre-processing unit 1501 while using the reference point 301 as the center in the enlargement, and performs sharpening processing on the image having been subjected to the enlargement processing according to an enlargement ratio.

FIG. 13B is a block diagram illustrating blocks included in the post-processing unit 1502.

As illustrated in FIG. 13B, the post-processing unit 1502 includes a periphery enlargement processing unit 1601 and a periphery sharpening processing unit 1602. Operations of the respective processing units of the post-processing unit 1502 are performed by the CPU 101.

First, the image generated by the pre-processing unit 1501 (hereinafter also referred to as a pre-processed image) is input into the post-processing unit 1502. The pre-processed image 1402 described here means an image on which the deformation processing is performed with the reference point 301 used as the center in the deformation, and then the sharpening processing is performed.

Then, the periphery enlargement processing unit 1601 performs processing for enlarging the peripheral region of the image on the pre-processed image 1402 while using the reference point 301 set by the reference point setting unit 201 as the center in the enlargement. The peripheral region of the image means a region surrounding the center of the image, more specifically, a region on the end side located away from the center of the image. At this time, the pre-processed image 1402 is an image having ends curved due to the deformation processing performed on the input image 200 with the reference point 301 used as the center in the deformation. Further, if the image after the deformation processing is arranged so as to be fitted into the input image size, the region 1403 near the vertexes in the pre-processed image 1402 is a region that does not include any of the pixels existing in the input image 200. Therefore, the periphery enlargement processing unit 1601 corrects the pre-processed image 1402 so that the region 1403 is not included within the input image size by enlarging the peripheral region of the pre-processed image 1402. In other words, according to the present exemplary embodiment, the periphery enlargement processing unit 1601 enlarges the peripheral region of the pre-processed image 1402 so that the periphery enlargement processing eliminates a portion that does not include any of the pixels existing in the image before the deformation processing, like the vicinity of the vertexes (the region 1403) in the image illustrated in FIG. 12B, from the image.

Now, the periphery enlargement processing unit 1601 will be described in detail with reference to FIGS. 14A, 14B, 14C, and 15.

Figure 14A:
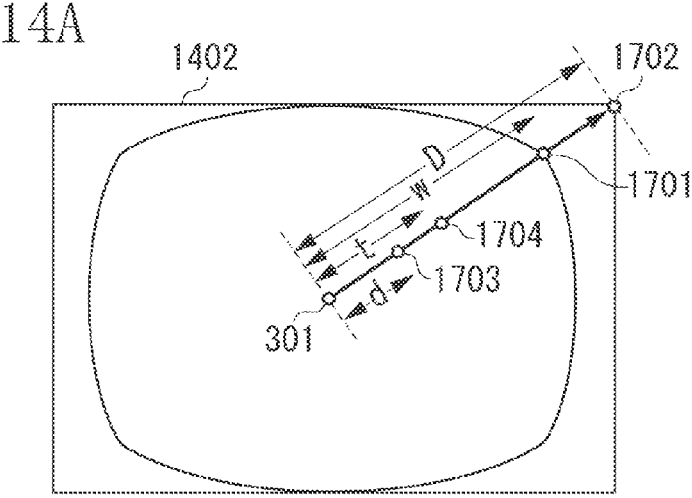
FIGS. 14A, 14B, and 14C illustrate a periphery enlargement processing unit and parameters used in periphery enlargement processing according to the third exemplary embodiment.

In FIG. 14A, the distance d indicates a distance between the reference point 301 and a target position 1703. The distance t indicates a distance between an acquisition position 1704 corresponding to the target position 1703 when the deformation processing is performed, and the reference point 301. Further, a position 1701 is a pixel position acquired when the pre-processing unit 1501 performs the deformation processing. The target position 1701 illustrated in FIG. 14A corresponds to the image vertex 302 of the original input image 200. A distance w indicates a distance between the position 1701 and the reference point 301.

Figure 14B:
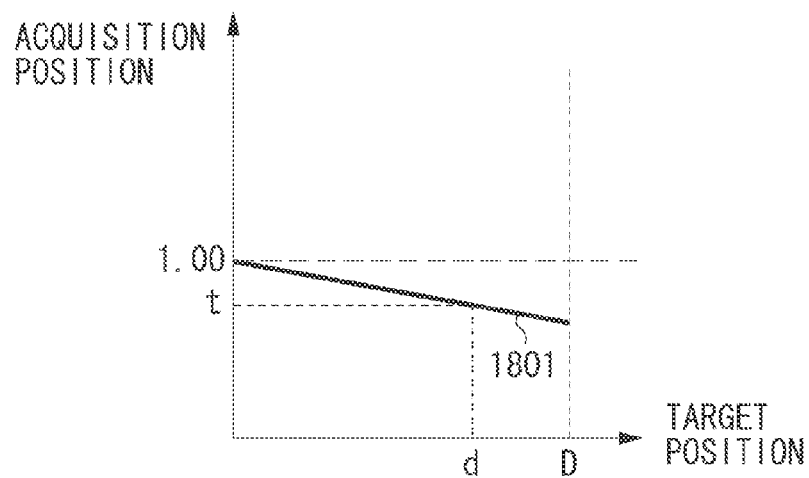

FIG. 14B illustrates an example of a parameter used in the periphery enlargement processing according to the present exemplary embodiment. A straight line 1801 illustrated in FIG. 14B indicates a parameter in a case where the distance t becomes longer than the distance d. Further, the straight line 1801 indicates a parameter in a case where a pixel value corresponding to the distance t of zero is acquired when the distance d is zero, and the distance t is set to w when the distance d is D. This means that the processing based on this parameter is enlargement processing with the reference point 301 used as the center in the enlargement. Further, this means that the position 1701 is acquired when the position 1702 is set as the target position.

Figure 14C:
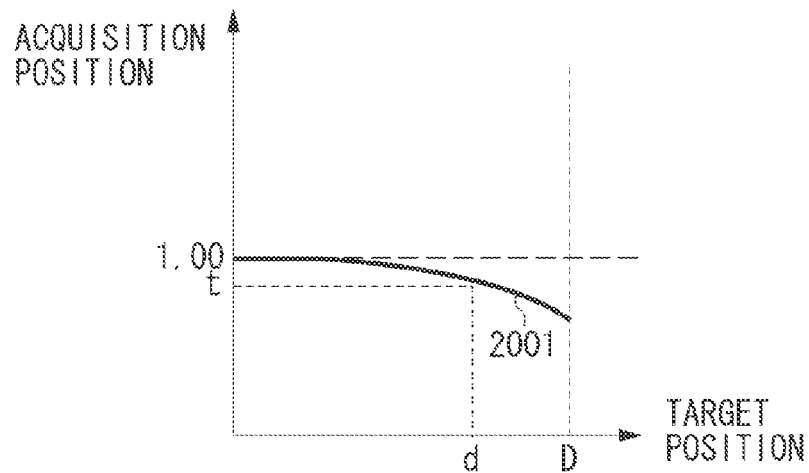

In the present exemplary embodiment, the straight line 1801 illustrated in FIG. 12B indicates the parameter for enlarging the periphery. However, this parameter is not limited thereto, as long as this parameter is a parameter capable of preventing the region 1403 that does not include any of the pixels existing in the original input image 200 from remaining at the ends of the image. For example, this parameter may be a parameter for the periphery enlargement processing as illustrated in FIG. 14C. A curved line 2001 illustrated in FIG. 14C indicates a parameter for prioritizing the processing performed by the pre-processing unit 1501 in the region close to the reference point 301. In other words, the curved line 2001 illustrated in FIG. 14C indicates a parameter for eliminating the region 1403 that does not include any of the pixels existing in the input image 200, while maintaining the portion close to the reference point 301 in its current state without enlarging it so much.

Figure 15:
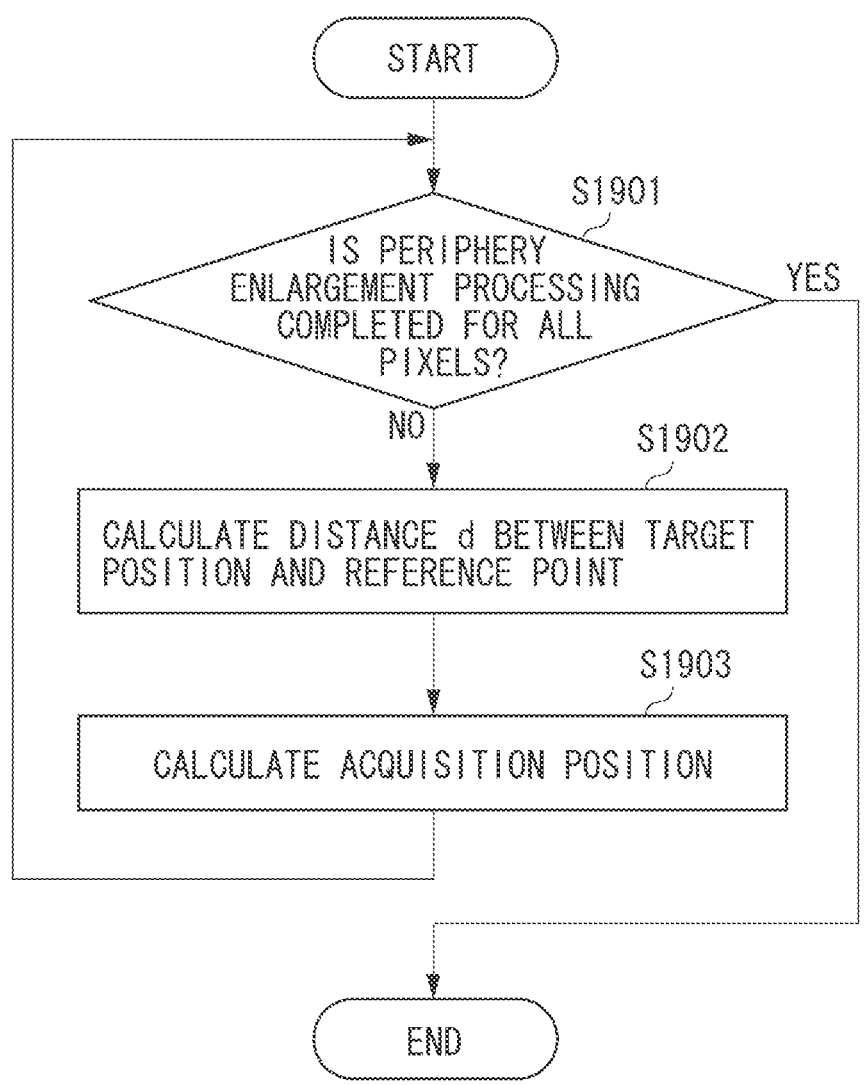
FIG. 15 illustrates a processing flow performed by the periphery enlargement processing unit according to the third exemplary embodiment.

FIG. 15 illustrates a processing flow performed by the periphery enlargement processing unit 1601 realized by the CPU 101. More specifically, FIG. 15 illustrates a flow until the periphery enlargement processing unit 1601 calculates the acquisition position 1704 while changing the target position 1703 for each pixel, thereby performing the periphery enlargement processing. In other words, the periphery enlargement processing unit 1601 performs the periphery enlargement processing on all of the pixels in the pre-processed image 1402 generated by the pre-processing unit 1501 while shifting the target position 1703.

First, in step S1901, the periphery enlargement processing unit 1601 determines whether the periphery enlargement processing is completed for all of the pixels. If the periphery enlargement processing is not completed for all of the pixels (NO in step S1901), the processing proceeds to step S1902.

In step S1902, the periphery enlargement processing unit 1601 calculates the distance d between the target position 1703 and the reference point 301, and then the processing proceeds to step S1903.

In step S1903, the periphery enlargement processing unit 1601 calculates the acquisition position 1704 corresponding to the target position 1703 based on the parameter for the periphery enlargement processing illustrated in FIG. 14B. Then, the periphery enlargement processing unit 1601 sets the pixel of the acquisition position 1704 spaced apart from the reference point 301 by the distance t as the pixel of the target position 1703 after the periphery enlargement processing. Then, the processing returns to step S1901, and the periphery enlargement processing unit 1601 performs the processing on the pixel of the next target position 1703.

Figure 16:
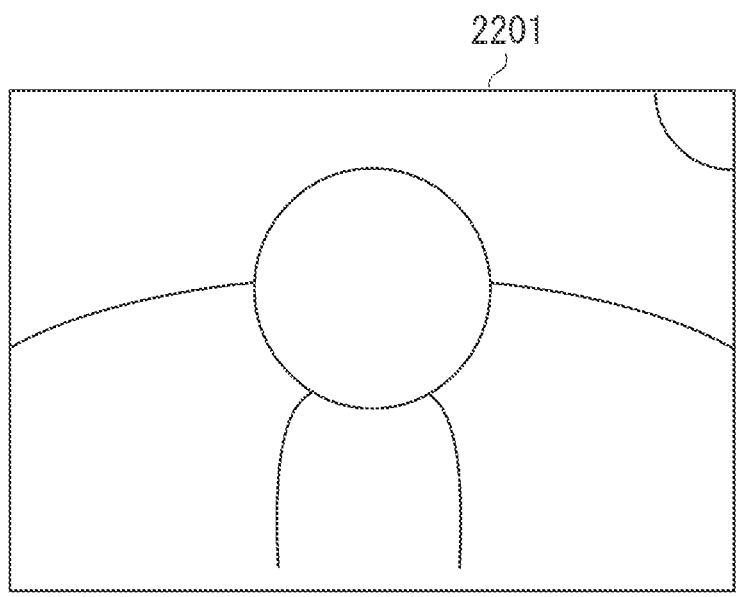
FIG. 16 illustrates an image after the periphery enlargement processing according to the third exemplary embodiment.

In this manner, steps S1901 to S1903 are repeated for all of the pixels, and the processing ends when the repetition for all of the pixels is completed (Yes in step S1901). As a result, an image 2201 after the periphery enlargement processing as illustrated in FIG. 16 is generated. In other words, an image free from a region that does not include any of the pixels existing in the input image 200 can be generated by the periphery enlargement processing unit 1601 performing the periphery enlargement processing. For example, the periphery enlargement processing can generate an image free from a region like the region 1403 in the pre-processed image 1402.

In this periphery enlargement processing, the periphery enlargement processing unit 1601 generates an output image having the same size as the input image 200 by removing pixels located beyond the image size of the input image 200. In other words, the periphery enlargement processing unit 1601 performs the processing for handling a region that does not include any of the pixels existing in the input image 200 (for example, the region 1403) as the outside of the input image size.

Then, the image 2201 after the periphery enlargement processing is performed by the periphery enlargement processing unit 1601 is input into the periphery sharpening processing unit 1602. The periphery sharpening processing unit 1602 performs the sharpening processing on a region blurred due to the enlargement of the periphery, thereby performing processing for reducing the blur.

Figure 17:
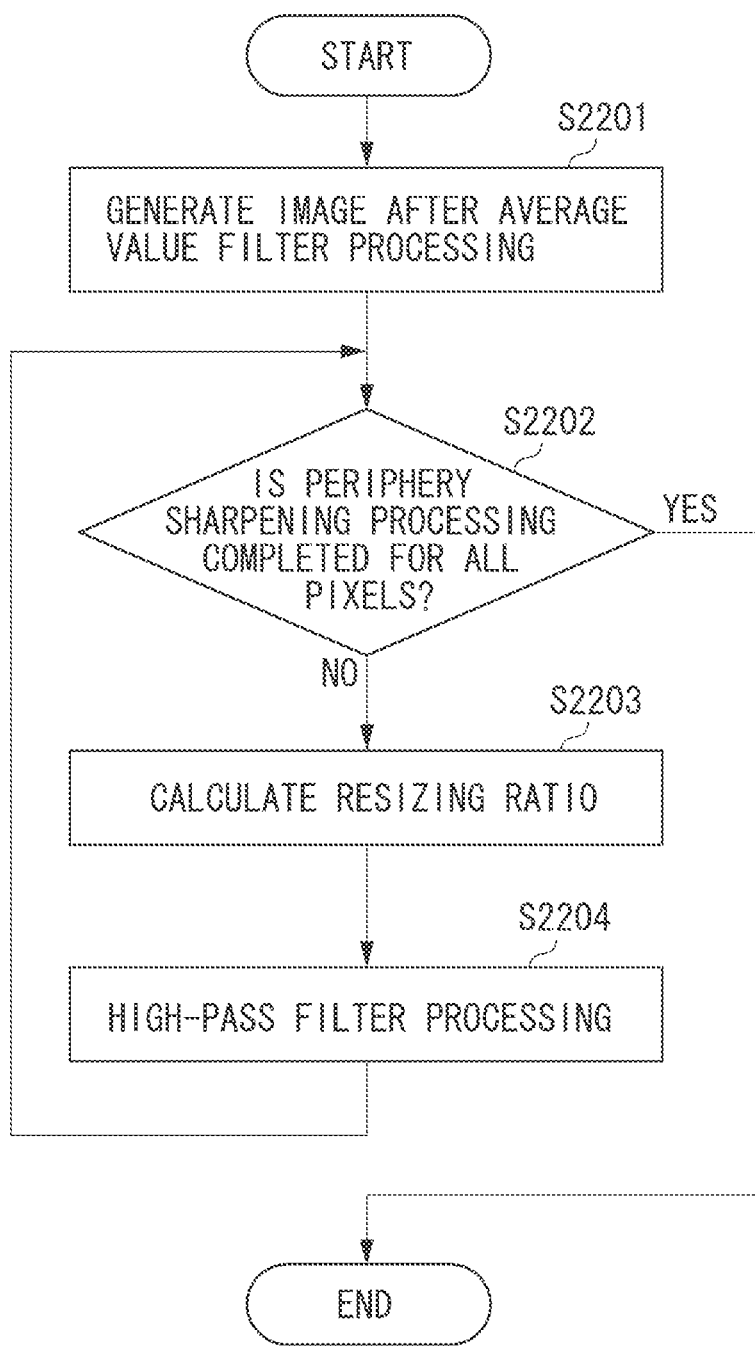
FIG. 17 illustrates a processing flow of periphery sharpening processing according to the third exemplary embodiment.

FIG. 17 illustrates a processing flow of the periphery sharpening processing performed by the CPU 101.

First, in step S2201, the periphery sharpening processing unit 1602 performs the average value filter processing based on 3×3 pixels, on the pre-processed image 1402 for each pixel. Because the average value filter processing is similar to that in the first exemplary embodiment, a description thereof is omitted here.

Next, the periphery sharpening processing unit 1602 performs the periphery sharpening processing on the pre-processed image 1402 while changing the target position 1703 for each pixel. First, in step S2202, the periphery sharpening processing unit 1602 determines whether the periphery sharpening processing is completed for all of the pixels. If the periphery sharpening processing is not completed for all of the pixels (NO in step S2202), the periphery sharpening processing proceeds to step S2203. In step S2203, the periphery sharpening processing unit 1602 calculates the resizing ratio R for each pixel. Because the calculation of the resizing ratio R is similar to that in the first exemplary embodiment, a description thereof is omitted here. At this time, the periphery sharpening processing unit 1602 calculates the resizing ratio R while using the target position 1703 instead of the target position 303 and using the acquisition position 1704 instead of the acquisition position 304. Next, in step S2204, the periphery sharpening processing unit 1602 performs the high-pass filter processing for increasing the sharpness on the pre-processed image 1402. Then, the periphery sharpening processing returns to step S2202, and the periphery sharpening processing unit 1602 performs the periphery sharpening processing on the pixel of the next target position 1703.

Because the high-pass filter processing is similar to that in the first exemplary embodiment, a detailed description thereof is omitted here. First, the periphery sharpening processing unit 1602 calculates the strength S of the filter processing with use of the parameter illustrated in FIG. 7, based on the resizing ratio R calculated in step S2203. The periphery sharpening processing unit 1602 calculates a value to be added as the pixel after the average value filter processing, based on the strength S, and then adds the calculated value to the pre-processed image 1402.

In this manner, steps S2202 to S2204 are repeated for all of the pixels, and then the periphery sharpening processing ends when the repetition for all of the pixels is completed (Yes in step S2202). In the periphery sharpening processing according to the present exemplary embodiment, the periphery sharpening processing unit 1602 performs the processing equivalent to the high-pass filter processing for enhancing the sharpness by adding the pixel after the average value filter processing. Therefore, the blurred state due to the enlargement processing can be corrected closer to the original flat state.

The image after the periphery sharpening processing is output as the output image 204. The output image 204 is stored into the secondary storage device 104, is displayed on the monitor 111, or is printed on a recording medium by the printer 110.

As described above, according to the present exemplary embodiment, the post-processing unit 1502 can generate an image free from a region non-existent in the input image 200, in other words, a region where there is no pixel, while reducing blurring generated due to the enlargement.

Performing the deformation processing with the reference point used as the center in the deformation while keeping the deformed image in the same size as the input image size results in generation of an image having curved ends and including a region that does not include any of the pixels existing in the input image 200. Therefore, the present exemplary embodiment can eliminate a region that does not include any of the pixels existing in the input image 200 from within the input image size by performing the periphery enlargement processing on the image after the deformation processing with the reference point 301 used as the center in the deformation (and after the sharpening processing). In this manner, the present exemplary embodiment can generate a visually improved image that does not include a pixel non-existent in the input image 200 within the input image size. The present exemplary embodiment can perform desired deformation processing while suppressing local blurring and excessive edge enhancement in a similar manner to the first and second exemplary embodiments.

According to the present exemplary embodiment, it is possible to acquire an image as if it is captured with use of a diagonal fisheye lens having an image circle diameter longer than a diagonal line of a screen.

Further, the present exemplary embodiment can reduce blurring generated during the periphery enlargement processing by further performing the periphery sharpening processing on the image having been subjected to the periphery enlargement processing.

Having described the respective exemplary embodiments of the present invention, the basic configuration of the present invention is not limited to the above-described examples. The above-described exemplary embodiments deform the input image 200 according to the distance d from the reference point 301 to the processing target pixel, and perform the sharpening processing on the deformed image while changing the strength S for each pixel. However, the present invention is not limited thereto. For example, the sharpening processing may be performed according to the distance d from the reference point 301 to the processing target pixel, and the deformation processing may be performed on the image having been subjected to the sharpening processing by changing the strength for each pixel.

The present invention may be applied to a system including a plurality of devices (for example, a host computer, an interface device, a reader, and a printer). Further, the present invention may be applied to an apparatus (for example, a printer, a copying machine, and a facsimile apparatus) including a single device.

According to an exemplary embodiment of the present invention, it is possible to provide an image processing apparatus, an image processing method, and a storage medium therefor that perform desired deformation processing while suppressing local blurring and excessive enhancement of sharpness.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-224604 filed Oct. 29, 2013, which is hereby incorporated by reference herein in its entirety.

What is claimed is:

1. An apparatus comprising:
  at least one processor and at least one memory coupled to each other,
  wherein the at least one processor operates to:
  acquire an input image;
  identify a distance from a reference point in the input image to a processing target pixel in the input image;
  perform deformation processing on an image based on the distance; and
  perform sharpening processing on an image while changing a strength of the sharpening processing,
    wherein the strength of the sharpening processing is changed based on a resizing ratio of the deformation processing of the processing target pixel.

2. The apparatus according to claim 1, wherein the sharpening processing is performed on the deformed image.

3. The apparatus according to claim 1, wherein the at least one processor further operates to acquire lens information for identifying a lens characteristic of a lens used to capture the input image, and
  wherein the strength of the sharpening processing is changed based on the resizing ratio and the acquired lens information.

4. The apparatus according to claim 1, wherein processing for enhancing an edge is performed as the sharpening processing on a region enlarged in the deformation processing in the image, and processing for blurring an edge is performed as the sharpening processing on a region reduced in the deformation processing in the image.

5. The apparatus according to claim 1, wherein high-pass filter processing is performed as the sharpening processing on a region enlarged in the deformation processing in the image, and low-pass filter processing is performed as the sharpening processing on a region reduced in the deformation processing in the image.

6. The apparatus according to claim 1, wherein the deformation processing is performed so as to enlarge a region located close to the reference point and reduce a region located away from the reference point.

7. The apparatus according to claim 1, wherein the at least one processor further operates to set the reference point.

8. The apparatus according to claim 1, wherein the at least one processor further operates to enlarge an outermost region in the image after the sharpening processing using the reference point as a center in enlargement.

9. The apparatus according to claim 8, wherein the at least one processor further operates to perform sharpening processing on the outermost region in the image that is enlarged.

10. A method comprising:
  acquiring an input image;
  identifying a distance from a reference point in the input image to a processing target pixel in the input image;
  performing deformation processing on an image based on the distance; and
  performing sharpening processing on an image while changing a strength of the sharpening processing,
    wherein the strength is changed based on a resizing ratio of the deformation processing of the processing target pixel.

11. A non-transitory computer-readable storage medium storing a program for causing a computer to execute a method, the method comprising:
  acquiring an input image;
  identifying a distance from a reference point in the input image to a processing target pixel in the input image;
  performing deformation processing on an image based on the distance; and
  performing sharpening processing on an image while changing a strength of the sharpening processing,
    wherein the strength is changed based on a resizing ratio of the deformation processing of the processing target pixel.

12. The apparatus according to claim 1, wherein the resizing ratio is determined for each of a plurality of processing target pixels in the input image.

13. The apparatus according to claim 1, wherein the image is deformed by specifying an acquisition pixel corresponding to the processing target pixel based on the distance and by setting a pixel value obtained by using a pixel value of the specified acquisition pixel as a pixel value of the processing target pixel, for each of a plurality of processing target pixels in the input image.

14. The apparatus according to claim 13, wherein the acquisition pixel is specified based on the distance and a first parameter, and a parameter for enlarging a vicinity region of a center that surrounds the reference point and reducing an outer region in the input image is used as the first parameter.

15. The apparatus according to claim 13, wherein the resizing ratio is a ratio of a second distance between the reference point and the acquisition pixel to the distance.

16. The apparatus according to claim 7, wherein the reference point is set based on a user instruction.

17. The apparatus according to claim 7, wherein the reference point is set based on at least one of image analysis information of the input image and shooting information of the input image.

18. The apparatus according to claim 7, wherein a center of an object in the input image is set as the reference point.

19. The apparatus according to claim 1, further comprising a display unit configured to display the image on which the deformation processing and the sharpening processing have been performed.

20. The apparatus according to claim 1, wherein the strength of the sharpening processing is a positive value in a case where the processing target pixel is in a region which is enlarged in the deformation processing, and wherein the strength of the sharpening processing is a negative value in a case where the processing target pixel is in a region which is reduced in the deformation processing.

21. The method according to claim 10, wherein the resizing ratio is determined for each of a plurality of processing target pixels in the input image.

22. The method according to claim 10, wherein the image is deformed by specifying an acquisition pixel corresponding to the processing target pixel based on the distance and by setting a pixel value obtained by using a pixel value of the specified acquisition pixel as a pixel value of the processing target pixel, for each of a plurality of processing target pixels in the input image.

23. The method according to claim 22, wherein the resizing ratio is a ratio of a second distance between the reference point and the acquisition pixel to the distance.

24. The method according to claim 10, wherein the strength of the sharpening processing is a positive value in a case where the processing target pixel is in a region which is enlarged in the deformation processing, and wherein the strength of the sharpening processing is a negative value in a case where the processing target pixel is in a region which is reduced in the deformation processing.

25. The non-transitory computer-readable storage medium according to claim 11, wherein the resizing ratio is determined for each of a plurality of processing target pixels in the input image.

26. The non-transitory computer-readable storage medium according to claim 11, wherein the image is deformed by specifying an acquisition pixel corresponding to the processing target pixel based on the distance and by setting a pixel value obtained by using a pixel value of the specified acquisition pixel as a pixel value of the processing target pixel, for each of a plurality of processing target pixels in the input image.

27. The non-transitory computer-readable storage medium according to claim 26, wherein the resizing ratio is a ratio of a second distance between the reference point and the acquisition pixel to the distance.

28. The non-transitory computer-readable storage medium according to claim 11, wherein the strength of the sharpening processing is a positive value in a case where the processing target pixel is in a region which is enlarged in the deformation processing, and wherein the strength of the sharpening processing is a negative value in a case where the processing target pixel is in a region which is reduced in the deformation processing.

* * * * *